US010009582B2

(12) United States Patent
Olsson et al.

(10) Patent No.: US 10,009,582 B2
(45) Date of Patent: Jun. 26, 2018

(54) PIPE INSPECTION SYSTEM WITH REPLACEABLE CABLE STORAGE DRUM

(75) Inventors: Mark S. Olsson, La Jolla, CA (US); Eric M. Chapman, Santee, CA (US); Dawn E. Shaffer, San Diego, CA (US); Loni M. Canepa, San Diego, CA (US); James F. Kleyn, Santee, CA (US); Lisa E. Latimer, San Diego, CA (US)

(73) Assignee: SEESOON, INC., San Diego, CA (US)

( * ) Notice: Subject to any disclaimer, the term of this patent is extended or adjusted under 35 U.S.C. 154(b) by 2082 days.

(21) Appl. No.: 12/704,808

(22) Filed: Feb. 12, 2010

(65) Prior Publication Data

US 2010/0208056 A1 Aug. 19, 2010

Related U.S. Application Data

(60) Provisional application No. 61/152,947, filed on Feb. 16, 2009, provisional application No. 61/152,662, filed on Feb. 13, 2009.

(51) Int. Cl.
*H04N 7/18* (2006.01)
*G01D 11/30* (2006.01)
*H04N 5/225* (2006.01)

(52) U.S. Cl.
CPC ............. *H04N 7/185* (2013.01); *G01D 11/30* (2013.01); *H04N 5/2253* (2013.01); *H04N 7/183* (2013.01); *H04N 2005/2255* (2013.01)

(58) Field of Classification Search
CPC ...... H04N 7/183; H04N 7/185; H04N 5/2253; H04N 2005/2255; G01D 11/30
USPC .......................................................... 348/84
See application file for complete search history.

(56) References Cited

U.S. PATENT DOCUMENTS

| 5,076,794 | A | * | 12/1991 | Ganthier | 439/70 |
| 5,934,911 | A | | 8/1999 | Stout | |
| 6,517,357 | B1 | * | 2/2003 | Athanasiou et al. | 439/26 |
| 6,545,704 | B1 | * | 4/2003 | Olsson et al. | 348/84 |
| 6,793,415 | B2 | * | 9/2004 | Arbuckle | 396/427 |
| 7,221,136 | B2 | * | 5/2007 | Olsson et al. | 324/67 |
| 7,298,126 | B1 | * | 11/2007 | Olsson et al. | 324/67 |
| 7,359,611 | B1 | * | 4/2008 | Kaplan | 385/135 |
| 7,431,619 | B2 | * | 10/2008 | Boehnlein et al. | 439/882 |
| 8,264,226 | B1 | * | 9/2012 | Olsson et al. | 324/329 |
| 2008/0243003 | A1 | * | 10/2008 | Crunkilton et al. | 600/459 |
| 2009/0320279 | A1 | * | 12/2009 | Jayko et al. | 29/732 |

* cited by examiner

*Primary Examiner* — Christopher S Kelley
*Assistant Examiner* — Maria Vazquez Colon
(74) *Attorney, Agent, or Firm* — Steven C. Tietsworth, Esq

(57) ABSTRACT

A pipe inspection system includes a cable storage drum and a housing configured to removably receive and rotatably support the cable storage drum. A push-cable with a plurality of conductors is stored in the cable storage drum. A camera head is connected to a distal end of the push-cable. A slip-ring assembly has first and second mating portions that when mated provide conductive paths between the plurality of conductors at a proximal end of the push-capable and a display device. The first portion of the slip-ring assembly is mounted on the housing and the second portion of the slip-ring assembly is mounted on the removable cable storage drum. The system connection cable joining the inspection system with a display unit is removable and may be replaced with cables compatible with various alternate image display systems.

29 Claims, 29 Drawing Sheets

PIPE INSPECTION SYSTEM WITH REPLACEABLE CABLE STORAGE DRUM

CROSS-REFERENCE TO RELATED APPLICATION AND PATENTS

This application is related to U.S. patent application Ser. No. 12/399,859 filed Mar. 6, 2009, by Mark S. Olsson et al, entitled "Pipe Inspection System with Selective Image Capture," It is also related to U.S. patent application Ser. No. 12/371,540 filed on Feb. 13, 2009 by Mark S. Olsson et al entitled "High-Performance Push-cable" and to U.S. Pat. No. 5,808,239 granted Sep. 15, 1998 to Mark S. Olsson and entitled "Video Push-cable." The entire disclosures of the aforementioned applications and patent are hereby incorporated by reference. This application claims priority from Provisional U.S. Patent Application Ser. No. 61/152,662 filed Feb. 13, 2009, by Dawn Shaffer et al. and entitled "High-Performance Pipe Inspection System," and from Provisional U.S. Patent Application Ser. No. 61/152,947 filed Feb. 16, 2009 by Mark S. Olsson et al. and entitled "Pipe Inspection System with Replaceable Cable Storage Drum."

BACKGROUND

Field of the Invention

This invention relates generally to pipe inspection systems employing a camera head connected to the end of a push-cable payed out from a rotatable cable drum.

Description of the Related Art

There are many situations where it is desirable to internally inspect long lengths of pipe that are already in place, either underground, in a building, or underwater. For example, sewer and drain pipes frequently must be internally inspected to diagnose any existing problems and to determine if there are any breaks causing leakage or obstructions impairing the free flow of waste. It is also important to internally inspect steam pipes, heat exchanger pipes, water pipes, gas pipes, electrical conduits, and fiber optic conduits for similar reasons. Frequently, pipes that are to be internally inspected have an internal diameter of six inches or less, and these pipes may make sharp turns. It is sometimes necessary to internally inspect several hundred feet of pipe.

Conventional video pipe inspection systems include a video camera head that is forced down the pipe to display the pipe interior on a video display. The inspection is commonly recorded using a video recorder (VCR) or digital video disk (DVD). Conventional video pipe inspection systems have included a semi-rigid push-cable that provides an electro-mechanical connection between the camera head that encloses and protects the video camera and a rotatable push reel or cable storage drum that is used to pay out push-cable and force the camera head down the pipe. Examples of suitable video push-cables are disclosed in U.S. Pat. No. 5,457,288 issued Oct. 10, 1995 to Mark S. Olsson and U.S. Pat. No. 5,808,239 issued Sep. 15, 1998 to Mark S. Olsson. The video camera head design and the manner in which it is connected to the push-cable are important to the performance and reliability of a video pipe inspection system.

Conventional pipe inspection systems use a semi-rigid push-cable to move the camera head down a length of pipe. The push-cable must be resilient and have enough flexibility to enable the camera head to negotiate turns. The types of push-cables used in conventional pipe inspection systems limit the turn radius through which the camera may pass, making it extremely difficult, for example, to inspect the interior of a toilet drain or a sink drain due to the tight turns of their piping.

A conventional video pipe inspection system includes a reel or drum for storage of the coils of the push-cable. The reel or drum is typically supported on a frame for rotation about a horizontal or a vertical axis for paying out the push-cable and for rewinding the push-cable for storage. A slip-ring assembly is typically included in the hub and/or axle of the reel or drum to continue electrical connections between the end of the push-cable and external circuits that power the camera head and receive video signals therefrom. Existing systems tend to be heavy and unwieldy in field operations, suffering in portability in order to store hundreds of feet of semi-rigid push-cable around the reel or inside the drum. Traditional storage drums are difficult to remove from the frame of the system, difficult to clean, and can be used only with a single proprietary inspection camera and connection system for which they are designed. Additionally, because of the design of their push-cable and the size of camera heads commonly used, conventional pipe inspection systems cannot negotiate extremely small-bore passages and extremely tight turns.

SUMMARY OF THE INVENTION

The present invention provides a pipe inspection system including a cable storage drum and a housing configured to removably receive and rotatably support the cable storage drum. A push-cable with a plurality of conductors is stored in the cable storage drum. A camera head is connected to a distal end of the push-cable. A slip-ring assembly has first and second mating portions that when mated provide conductive paths between the plurality of conductors at a proximal end of the push-capable and a display device. The first portion of the slip-ring assembly is mounted on the housing and the second portion of the slip-ring assembly is mounted on the removable cable storage drum.

BRIEF DESCRIPTION OF THE DRAWINGS

Unless the parts are electrical connections or fasteners, the parts illustrated in the drawings are generally made of molded plastic. Throughout the drawing figures, like reference numerals refer to like parts.

DETAILED DESCRIPTION

The present invention provides an improved pipe inspection system that is lower in weight and more easily portable. It includes a removable and readily replaceable push-cable storage drum that rapidly allows the system to utilize different pipe image cameras that utilize different types of push-cables. The present invention is advantageously utilized with different small hand-held display and image capture devices by the simple expedient of swapping the removable system connection cable for one compatible with a different device.

The present invention also provides a novel cable storage drum which is readily removable and replaceable by simply opening two latches on a clam-shell case. As a result the drum may be rapidly replaced with a drum holding a longer cable, a more flexible cable, or a different camera, or a sonde-only cable system. A separable slip-ring assembly, attached to a removable system cable from a display device, connects the removable push-cable and storage drum with the monitoring electronics.

Figure 1:
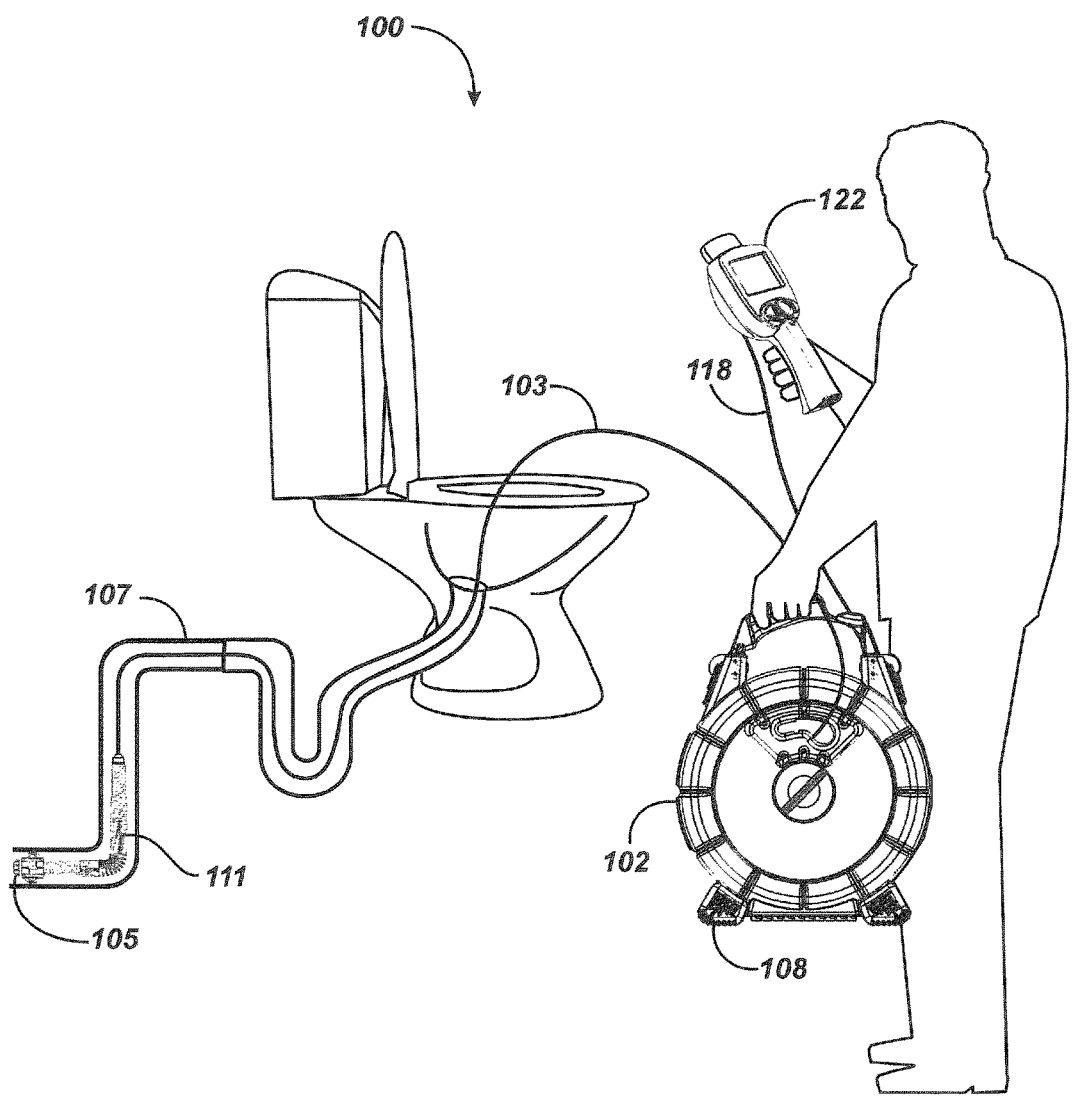
FIG. 1 is a diagrammatic illustration of an exemplary embodiment of the pipe inspection system of the present invention as deployed in use.

Referring to FIG. 1, a pipe inspection system 100 comprises a hand-held display and image capture device 122, a clam-shell housing including a front outer casing 102 with snap-on molded supporting feet 108, and removable system connection cable 118 relaying camera information from flexible resilient push-cable 103 to the display and image capture device 122. A camera assembly 105 and a protective stainless steel coil spring assembly 111 are attached to a distal end of the push-cable 103. Images generated by the camera assembly 105 within a pipe 107 are electronically translated into electrical impulses transmitted along conductors embedded in the push-cable 103, and transferred through a slip-ring assembly to the system connection cable 118 and then to the display and image capture device 122. Camera control signals may be transmitted in the reverse direction to the camera assembly 105. In the embodiment of FIG. 1 the pipe inspection images are monitored with the commercially available Perceptron® Micro-Explorer hand-held display and image capture device 122. Other display devices may be used. The push-cable 103 is resilient and flexible, and may be of the type illustrated in U.S. Pat. No. 5,939,679 granted Aug. 17, 1999 to Mark S. Olsson, the disclosure of which is hereby incorporated by reference. For applications with smaller pipe diameters and short camera head insertions, the push-cable 103 may be of the type disclose in pending U.S. patent application Ser. No. 12/371, 540 filed Feb. 13, 2009 by Mark S. Olsson et al, or a similar type. The entire disclosure of said application is hereby incorporated by reference.

Figure 2A:
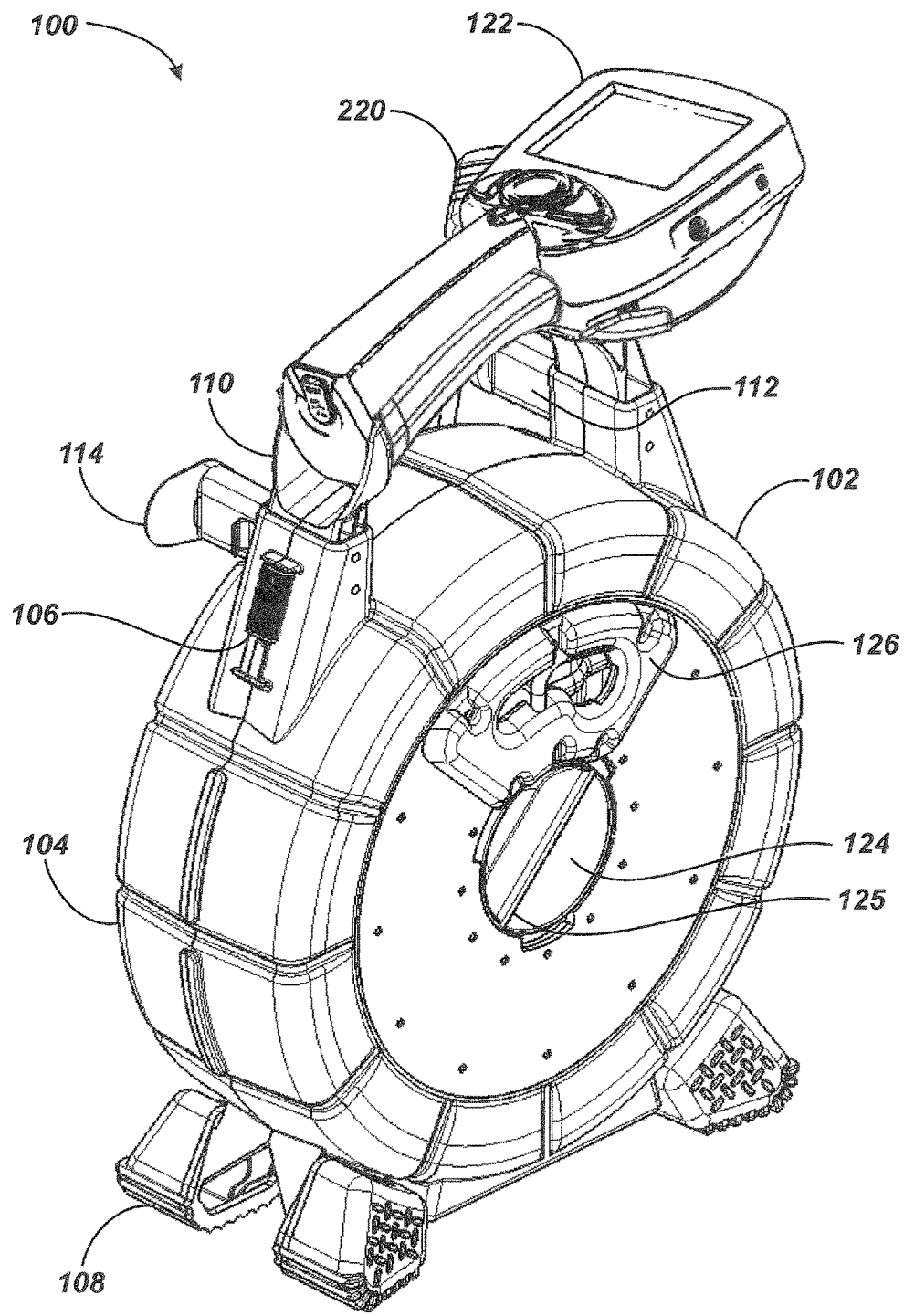
FIG. 2A is an isometric front view of the exterior of the pipe inspection system in its stowed configuration illustrating external components.
Figure 2B:
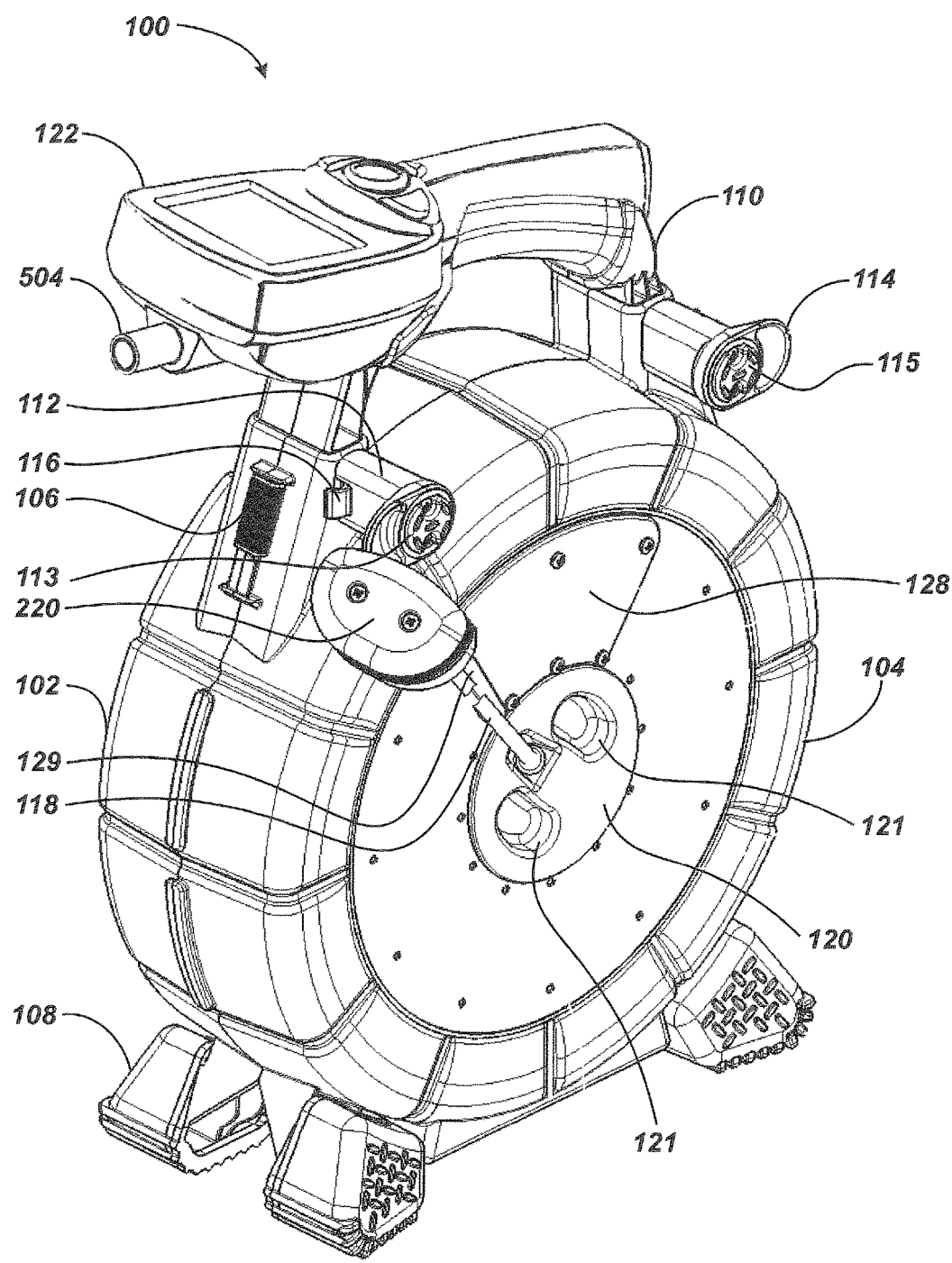
FIG. 2B is an isometric rear view similar to FIG. 2A.

In FIG. 2A, the hand-held display and image capture device 122 is seated in a dock handle 110 which is a single molded part. The dock handle 110 serves as a carrying and lifting handle for the overall system as well as a docking station for the hand-held display and image capture device 122. The dock handle 110 includes a cradle and snap-in mounting features (not visible) for releasably securing the hand-held display and image capture device 122. A system interface plug 220 removably connected to the system connection cable 118 is used to connect the display and image capture device 122 to the system connection cable 118 (FIG. 1). The front outer casing 102 is oriented toward the viewer in FIG. 2A. A symmetrical, identically formed rear outer casing 104 is partially visible on the left side of FIG. 2A. The front and rear outer casings 102 and 104 are preferably molded of plastic and are releasably joined by integrally molded cooperating hinges (202, FIG. 2C) into a clam-shell case which can be latched into a closed configuration by sliding a pair of latches 106 (FIGS. 2A and 2B). Below the display and image capture device 122 and dock handle 110 two horizontally extending cord-wrap arms 112 and 114 with retainer end flanges are provided so that the system connection cable 118 (FIG. 1) may be wrapped around the same for convenient storage.

The front and rear outer casings 102 and 104 include snap-on molded feet 108. In FIG. 2A one end of a hub cone 124 is seen in the center of an annular cable storage drum assembly 206 (FIG. 2C) that is encased by the two outer casings 102 and 104. The visible end of the hub cone 124 is formed with a rigid central diametrically extending grip 125 for rotating the cable storage drum assembly 206 (FIG. 2C) by a few degrees to incrementally advance the camera assembly 105 (FIG. 1) down the pipe 107 or tighten the cable coils within the drum. Normally the push-cable 103 is manually pushed or pulled to rotate the cable storage drum assembly 206 and rapidly advance or withdraw the camera assembly 105. The front outer casing 102 has a molded plastic cable guide 126, attached by six screws, to guide the push-cable 103 as the cable storage drum assembly 206 is rotated to pay out or re-wind the push-cable 103.

Figure 3A:
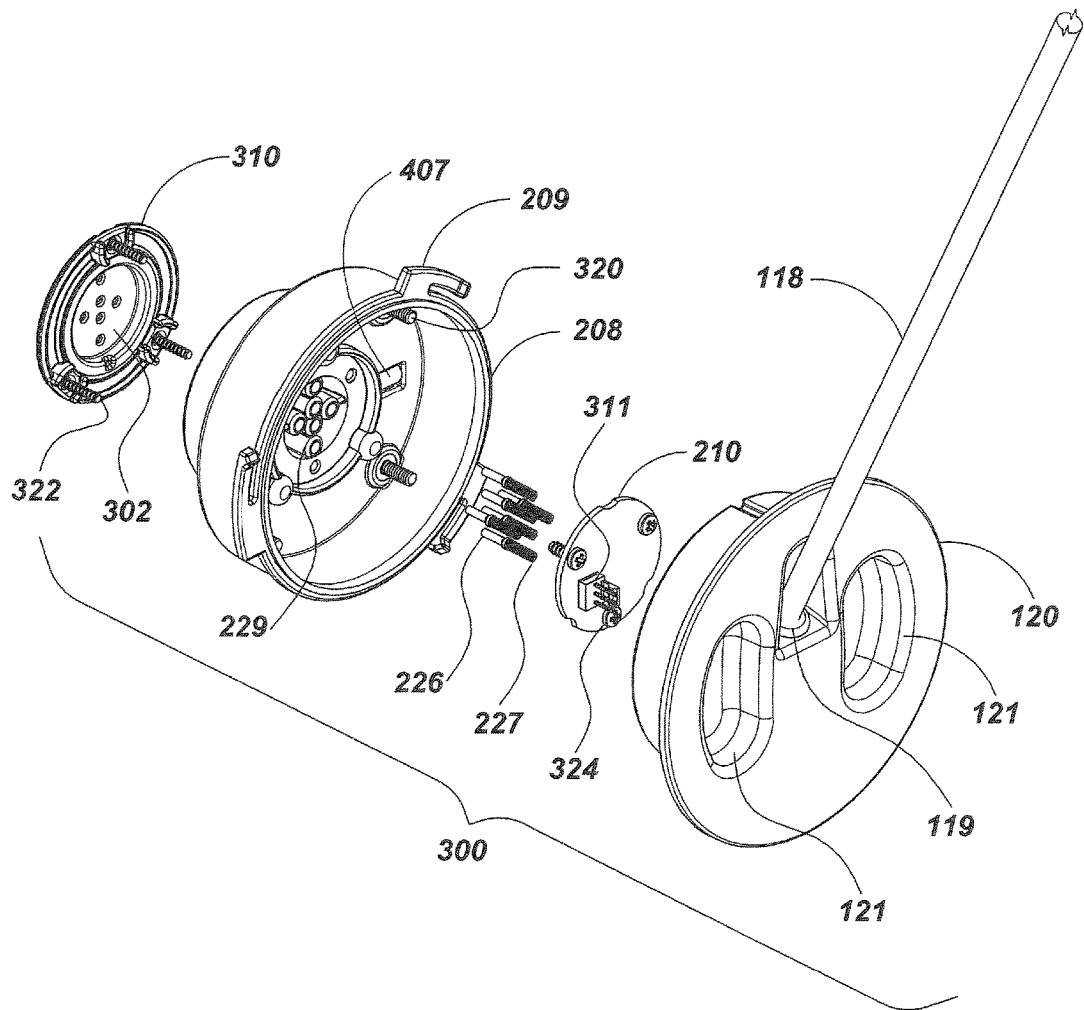
FIG. 3A is an enlarged exploded isometric view of the slip-ring assembly of the system of FIG. 1 taken from the rear side.
Figure 3B:
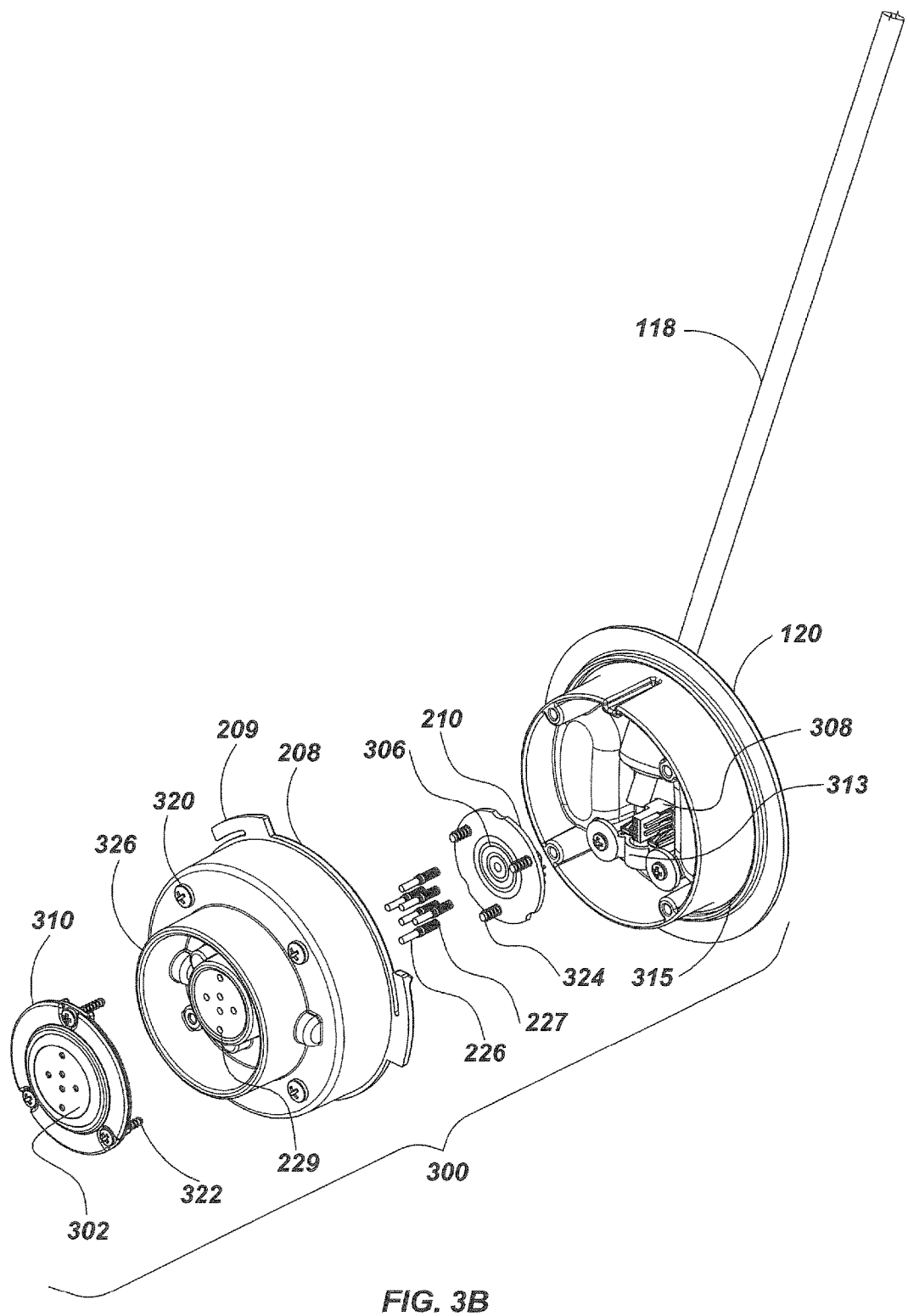
FIG. 3B is a view similar to FIG. 3A from the front side.

A slip-ring cover 120 (FIG. 2B) provides an entry for the proximal end of the system connection cable 118 for connection to a slip-ring assembly 300 (FIGS. 3A and 3B). The distal end of the system connection cable 118 is removably coupled to the display and image capture device 122 via the system interface plug 220, which is not mated in FIG. 2B. The slip-ring cover 120 has two recessed grips 121 molded into its surface which are used to remove the slip-ring assembly 300. The slip-ring cover 120 and the attached slip-ring assembly 300 are unlocked by rotating the slip-ring cover 120 counter-clockwise, freeing a portion of the slip-ring assembly 300 by releasing three locking keys frictionally secured to the rear outer casing 104. A cover plate 128 and cable grip 129 covers the opening in rear outer casing 104 which corresponds to the push-cable guide 126 and its opening in the front outer casing 102 (FIG. 2A).

Figure 2C:
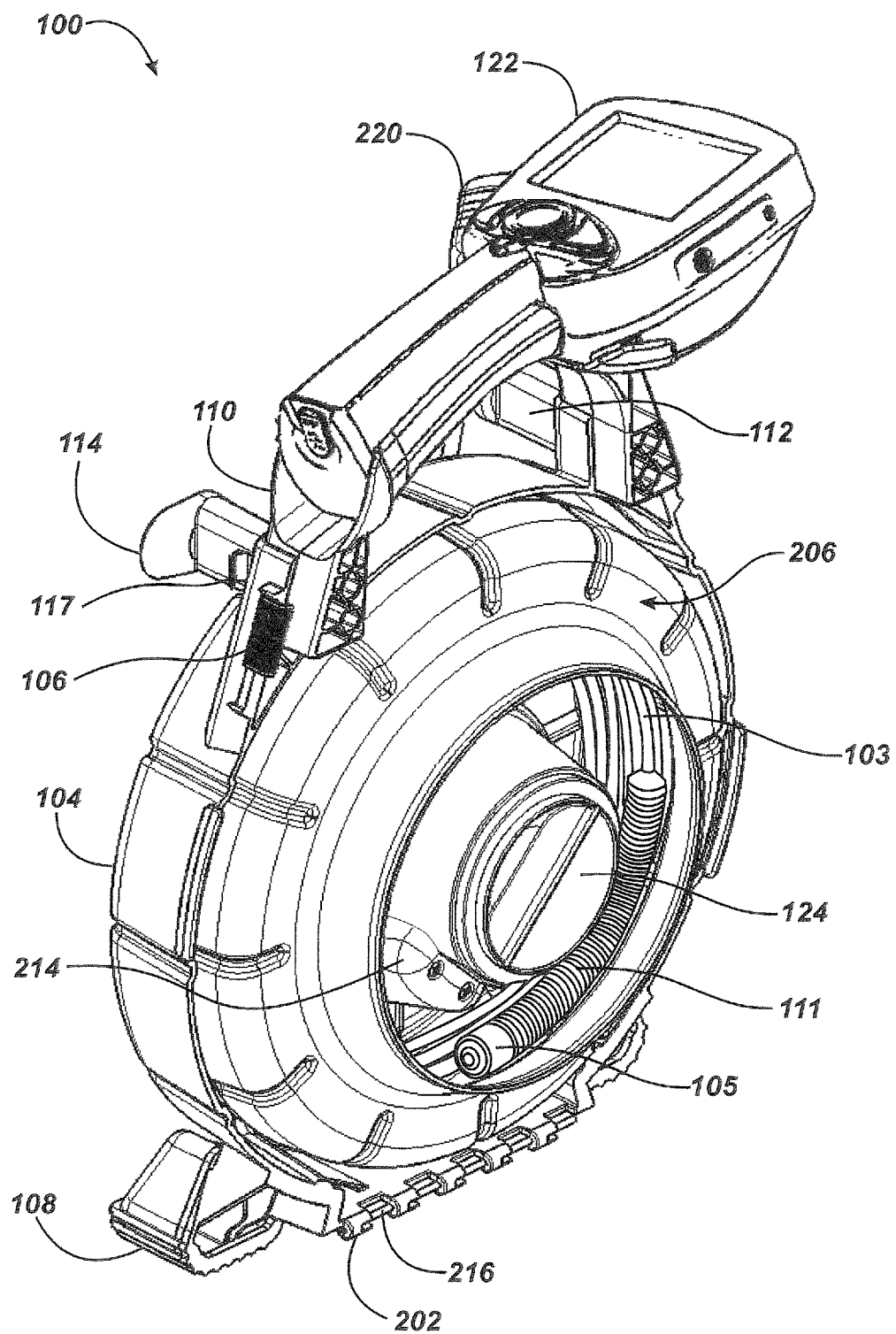
FIG. 2C is a view similar to FIG. 2A with the outer front outer casing removed.

In FIG. 2C, the pipe inspection system 100 is illustrated with the front outer casing 102 removed to expose cable storage drum assembly 206 seated within the rear outer casing 104. The molded hinge 202 and hinge pin 216 which join the casing halves into a clam-shell form can be seen at the bottom of rear outer casing 104 forward of foot 108. One of the latches 106 is illustrated in FIG. 2C in its upward, or OPEN position. The push-cable 103 is stored in a coil of multiple turns within the cable storage drum assembly 206 which, with the attached hub cone 124, rotates on molded circular bearing surfaces integral to rear outer casing 104 and front outer casing 102 (FIG. 2A). A user may manually grip the push-cable 103 in the vicinity of the cable guide 126 and push it down the pipe 107 (FIG. 1), which pulls the push-cable 103 out of the cable guide 126, at the same time rotating the cable storage drum assembly 206. In FIG. 2C a hub shield 214 is partially visible that is attached along the lower outer surface of hub cone 124. The hub shield 214 serves to protect and secure the electrical connections between push-cable 103 and hub cone 124 as will be hereinafter described. Cable storage clip 117 serves to retain the system connection cable as needed.

Figure 2D:
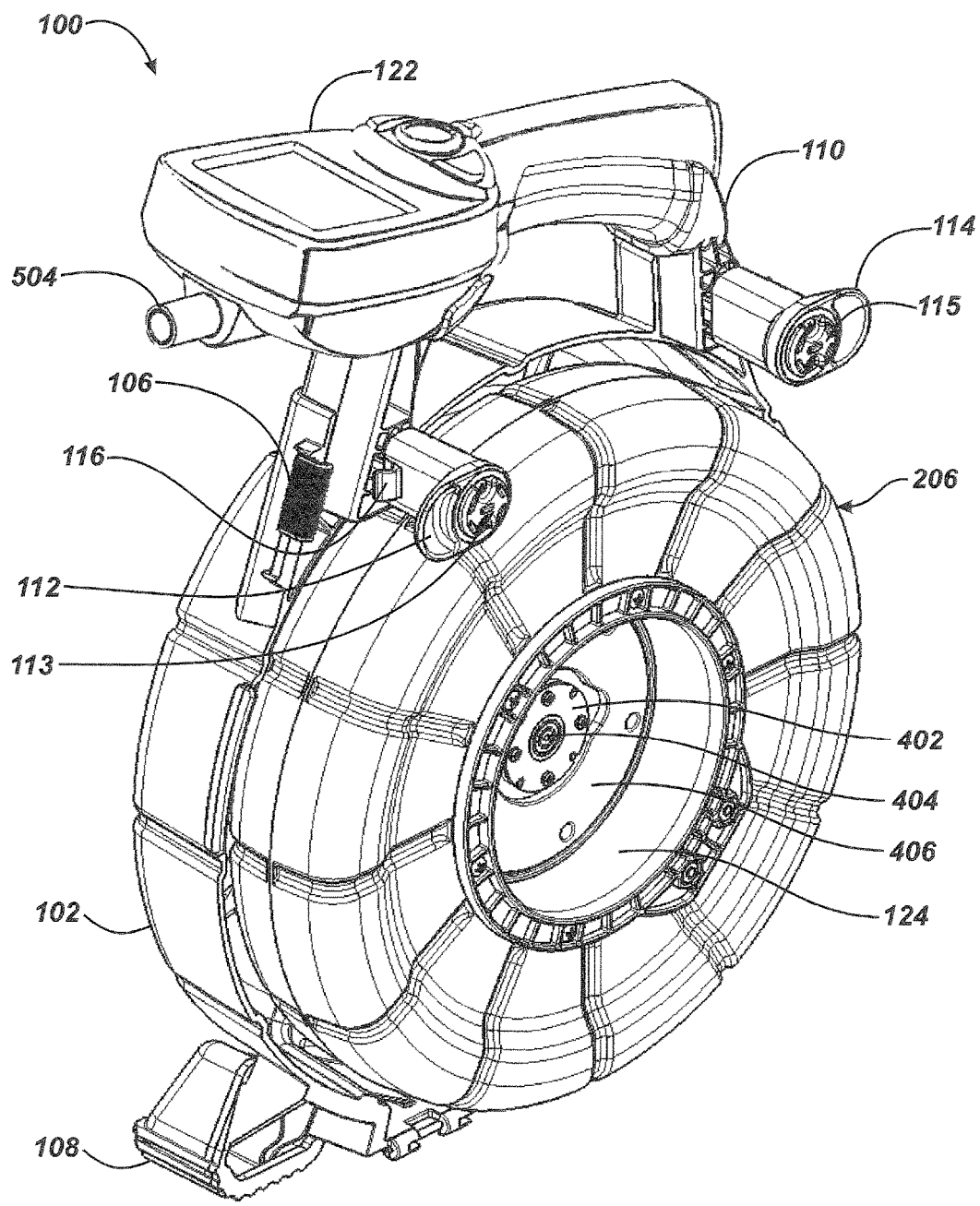
FIG. 2D is a view similar to FIG. 2B with the rear outer casing removed.

In FIG. 2D, the rear outer casing 104 of pipe inspection system 100 has been removed revealing the cable storage drum assembly 206. Visible in this view are the dock handle 110, case latch 106, cord-wrap arms 112 and 114, with an attached cable storage clip 116 for retaining the stored system connection cable 118 (FIG. 1). Molded feet 113 and 115 are seen attached to the projecting arms of the cord-wrap arms 112 and 114, which serve to support the pipe inspection system 100 in a horizontal orientation in use if desired, as illustrated in FIG. 8B. Display and image capture device input connector 504 on the display and image capture device 122 mates to the system interface plug 220 (FIG. 2B) connecting it to system connection cable 118. Within the hub cone 124, a hub PCB mount 406 supports a hub PCB 402 on which annular electrical contact rings 404 are etched.

Figure 2E:
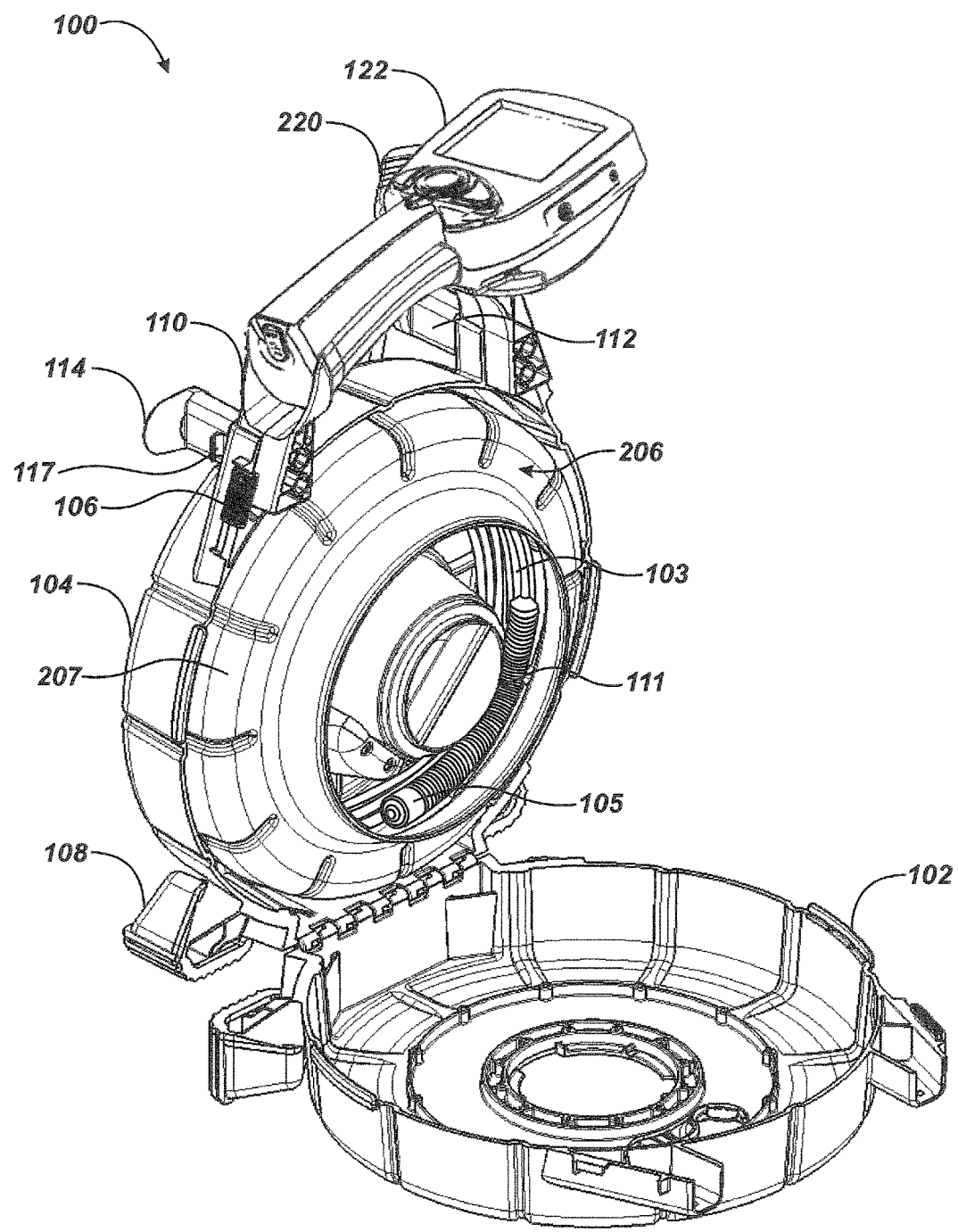
FIG. 2E is an isometric front view illustrating the external clam-shell case in an open configuration revealing the removable cable storage drum.

Referring to FIG. 2E, the front and rear casings 102 and 104 provide a clam-shell housing that is opened at the hinge molding 202 (FIG. 2C) by the opening of the two latches 106. The hand-held display and image capture device 122 is removably seated in the dock handle 110 located above the cord-wrap arms 112 and 114, with system interface plug 220 partially obscured, and not mated to the display and image capture device 122. The curvature in the sides of dock handle 110 is designed to provide a snap fit when the display and image capture device 122 is seated in the dock handle 110. The lower portion of the dock handle 110 is configured with sufficient strength and rigidity to serve as a lifting handle for the entire pipe inspection system 100. Opening the clam-shell housing, by first moving latches 106 on the left and right of pipe inspection system 100 upwardly, leaves the cable storage drum assembly 206 accessible for easy removal simply by lifting it out of the rear outer casing 104, such as for cleaning, repair or replacement of push-cable 103, camera assembly 105 and/or coil spring assembly 111, or replacing it with a different drum assembly. Cable storage clip 117 serves to retain the system connection cable as needed.

Referring now to FIG. 3A, the system connection cable 118 leading from the hand-held display and image capture device 122 (FIG. 1) enters the slip-ring cover 120 through an opening between the two recessed grips 121, and passes through a grommet 119. The system connection cable 118 is secured onto slip-ring cover 120 by, for example, a two-eared clamp 313 (FIG. 3B), and its conducting leads are connected electrically to a female connector 308 (FIG. 3B). The female connector 308 (FIG. 3B) mates with a three-pin IDC male connector 311 mounted on the back side of a fixed PCB 210. Three annular contact rings 306 (FIG. 3B) are formed on the front side of the PCB 210. Six contact pins 226 of a graphite-silver compound are biased by corresponding gold-plated springs 227. Springs 227 contact against the three annular contact rings 306 (FIG. 3B), two pins on each of the contact rings 306. The use of dual spring-loaded contact pins 226 for each of the annular contact rings 306 reduces contact noise in the transmission of electrical signals. The contact pins 226 and springs 227 are mounted in corresponding cylindrical sleeves 229 molded in a central wall portion of a cylindrical slip-ring housing 208 and the contact pins 226 and springs 227 are retained in sleeves 229 by a rubber contact seal 302 and a retainer 310. The seal 302 designed so that it seals the contact pins 226 in a water-tight fashion as they pass through the seal 302. The slip-ring housing 208 is formed with peripheral locking keys such as 209 which are engaged by mating features on the rear outer casing 104. The slip-ring assembly 300 can be manually inserted and twist-locked into the center of the rear outer casing 104 (FIG. 2B). The outer casings 102 and 104 of the clam-shell housing can then be latched together. The contact pins 226 are then held by the force of the springs 227 in electrical contact with a plurality of contact rings 404 (FIG. 2D) on a hub PCB 402 within the cable storage drum assembly 206 providing conductive paths between the push-cable 103 and the system connection cable 118. On the inner side of slip-ring housing 208, pockets are molded which retain magnets such as 407.

Referring to FIG. 3B, the slip-ring housing 208 has sleeves in its central wall for the six contact pins 226 (FIG. 3A) which are fit tightly through aligned apertures in the slip-ring contact seal 302 held by the seal retainer 310. The annular contact rings 306 may be etched into the copper cladding of the PCB 210 and are fixed relative to the contact pins 226, and do not rotate. Four screws 320 hold the slip-ring housing 208 and slip-ring cover 120 together. Three screws 322 pass through the perimeter of the seal retainer 310 attaching retainer 310 and seal 302 within a cylindrical shield ring 326 of the slip-ring housing 208 over the sleeves 229. The shield ring 326 is a molded section of the slip-ring housing 208 specifically designed to provide a protective recess for the protruding pins 226 seated in springs 227 and passing through the rubber seal 302 from the sleeves 229. Three screws 324 are attached from the back side of the PCB 210 to hold the PCB 210 onto the slip-ring housing 208. This compresses the springs 227. The slip-ring assembly 300 including the system connection cable 118 is entirely removable.

Figure 3C:
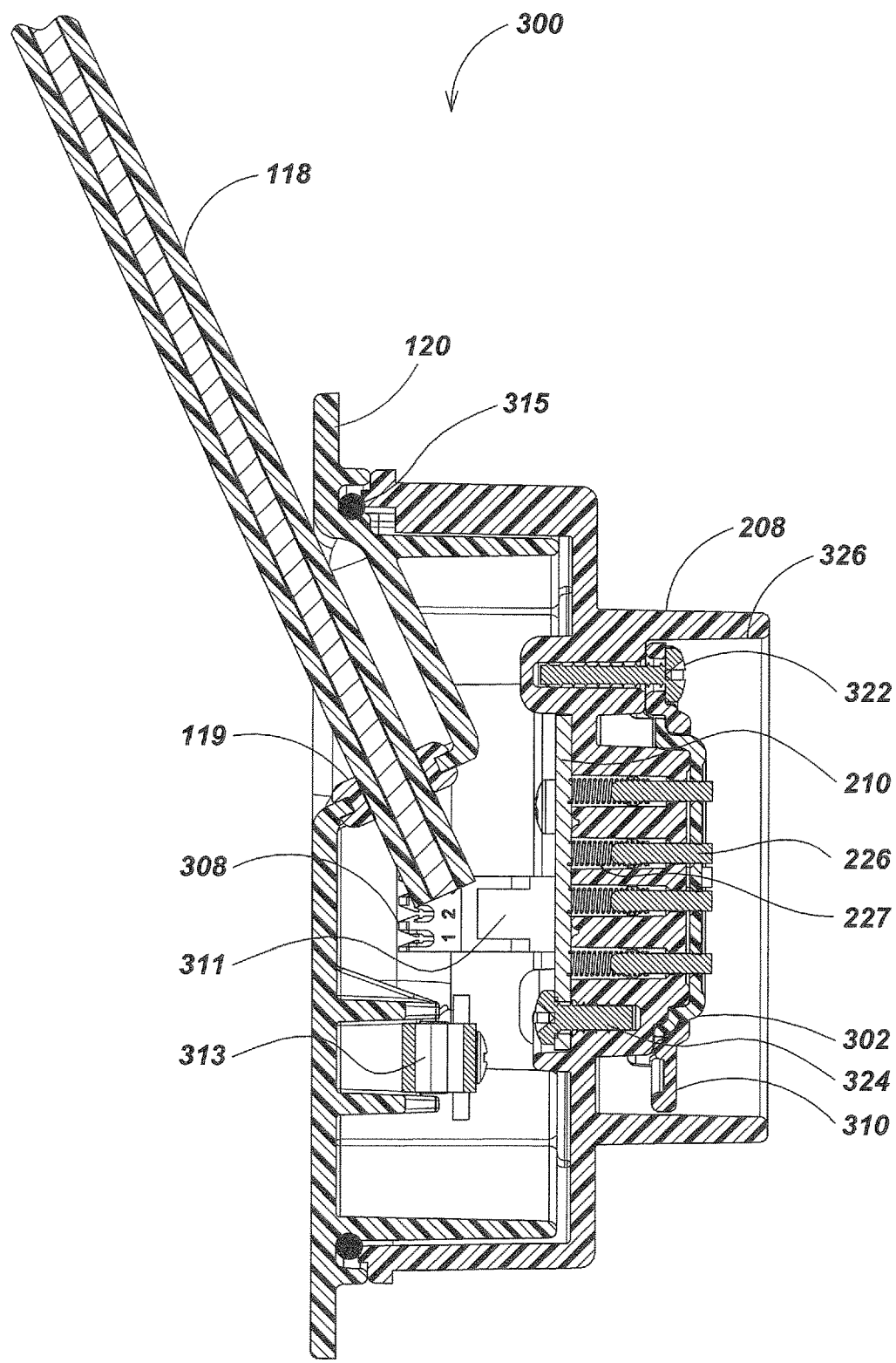
FIG. 3C is an enlarged vertical sectional view of the slip-ring assembly illustrated in FIGS. 3A and 3B.

Turning now to FIG. 3C, the system connection cable 118 passes through the rubber grommet 119 as it enters the slip-ring cover 120. A plurality of leads or conductors inside the system connection cable 118 are connected to the female connector 308, which in mates with the male connector 311 mounted on the PCB 210. The system connection cable 118 is secured to the slip-ring cover 120 by the clamp 313 which is in turn secured by two screws. The connecting surfaces of slip-ring cover 120 and slip-ring housing 208 deform and secure a seal 315. The screws 324 hold the PCB 210 onto the slip-ring housing 208. The springs 227 and the contact pins 226 are restrained by the rubber seal 302 and the retainer 310 is held in place by the screws 322. The shield ring 326 is formed so that the protruding contact pins 226 are well below the outer edge of the slip-ring housing 208, providing the contact pins 226 with protection from incidental impact or abrasion in use.

Figure 4A:
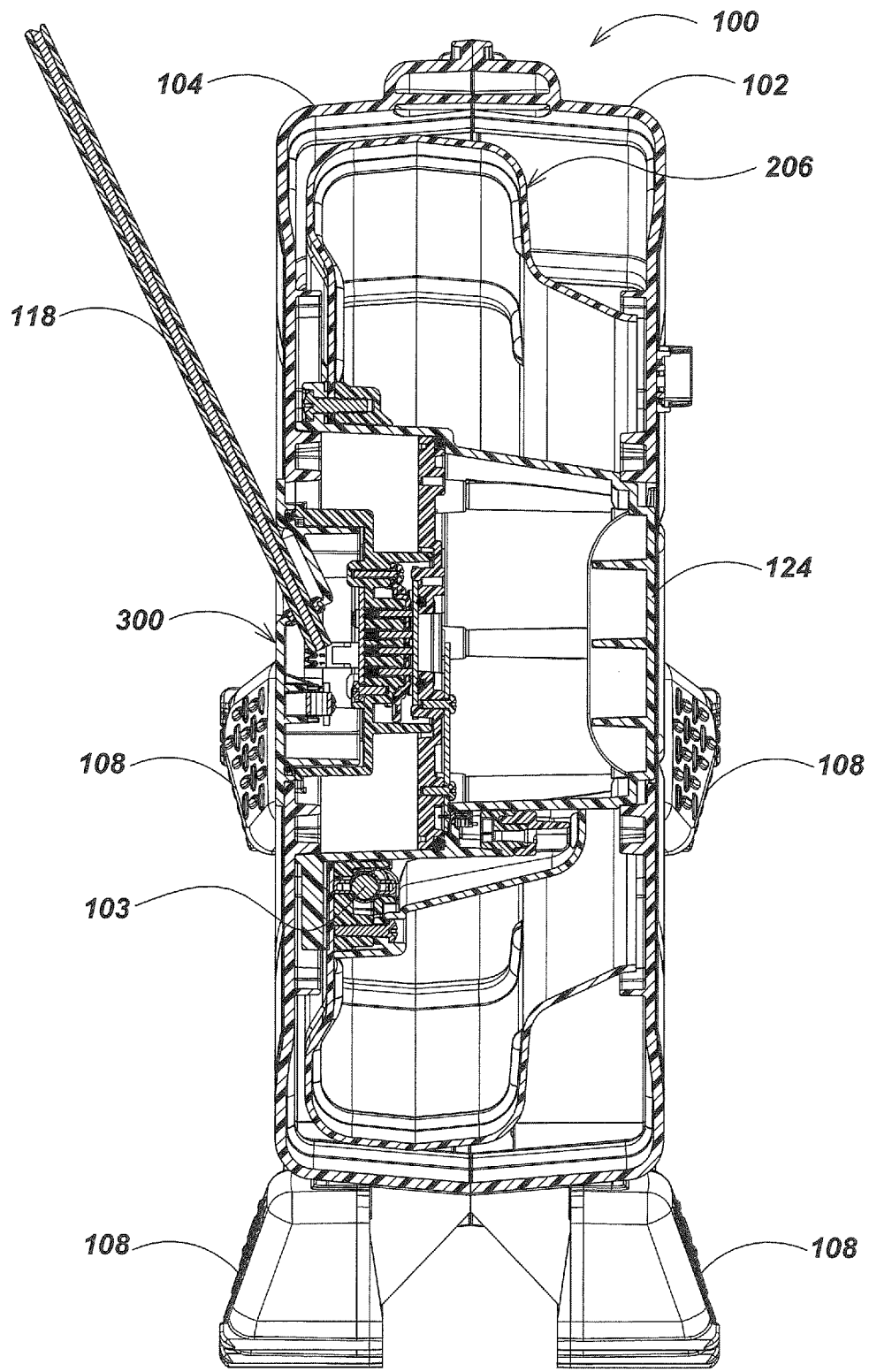
FIG. 4A is an enlarged vertical sectional view of the pipe inspection system of FIG. 1 taken through the rotational axis of the cable storage drum. The hand-held display and image capture device is not illustrated in this view.

In FIG. 4A a sectional view of pipe inspection system 100 is seen from above with system connection cable 118 and slip-ring assembly 300 on the left, held in place on rear outer casing 104. The four molded feet 108 support the outer casings 102 and 104. The cable storage drum assembly 206 is illustrated within the casings. The push-cable 103 is seen entering cable storage drum assembly 206, in cross-section. The central alignment of the hub cone 124 and the slip-ring assembly 300 is clearly illustrated in FIG. 4A.

Figure 4B:
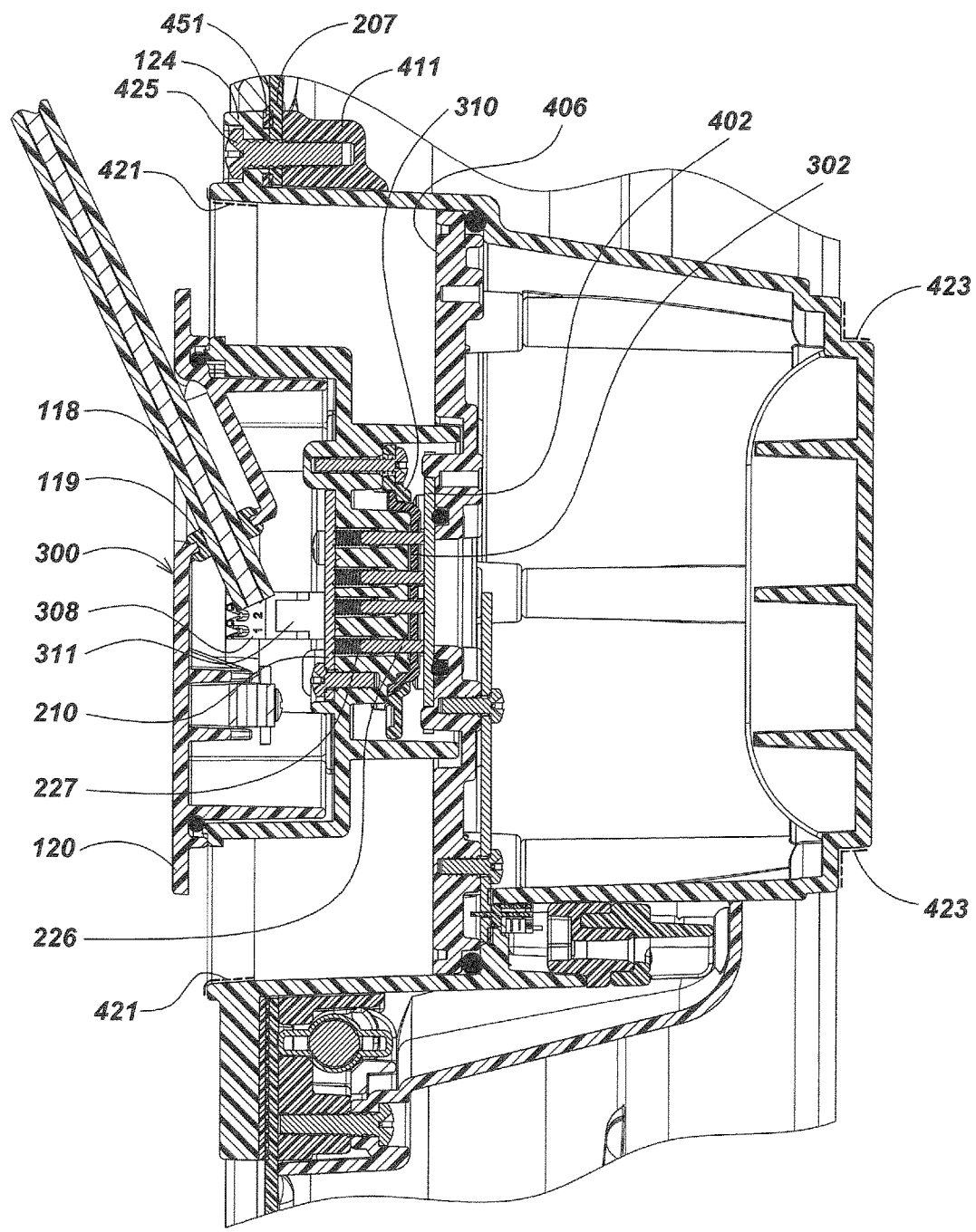
FIG. 4B is still further enlarged portion of FIG. 4A illustrating the relationship between the slip-ring assembly and the bearing surfaces of the clam-shell housing that support the cable storage drum.
Figure 4C:
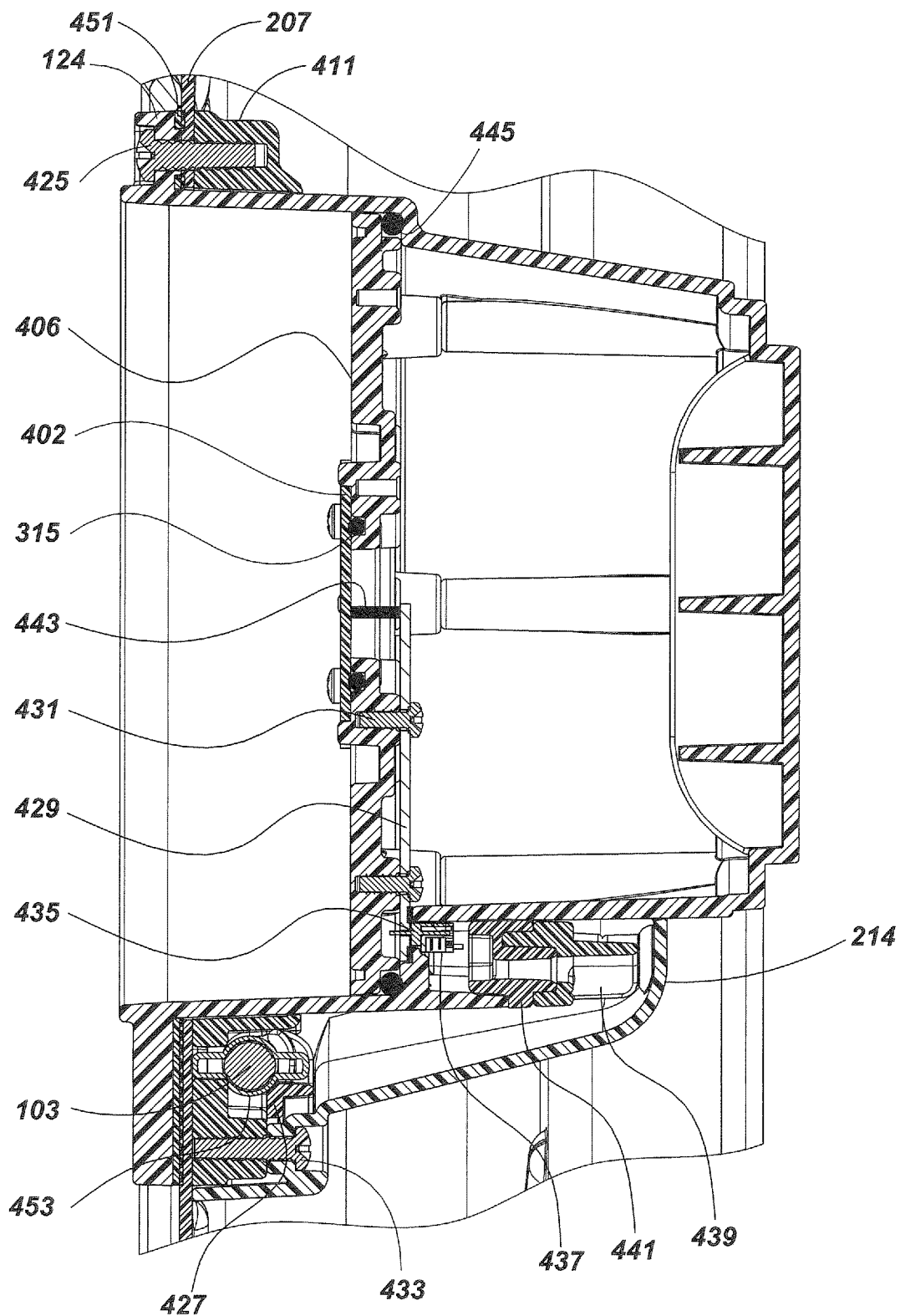
FIG. 4C is a view similar to FIG. 4B with a portion of the slip-ring assembly removed to illustrate the details of the push-cable connection to the slip-ring assembly.

FIGS. 4B and 4C illustrate further details of the relationship between the system connection cable 118 and its connected slip-ring assembly 300 and the cable storage drum assembly 206 (FIG. 4A). The system connection cable 118 enters the slip-ring cover 120 through the grommet 119, with its conductors connected to the cable-mounted female connector 308. Female connector 308 is mated with the PCB-mounted male connector 311. The PCB 210 with its annular contact rings 306 (FIG. 3B) is contacted by gold-plated springs 227. The contact pins 226 contact the springs 227 and the ends of the contact pins 226 are pressed into against the annular contact rings 404 (FIG. 2D) on the hub-PCB 402 thus completing the connection between system connection cable 118 and cable storage drum assembly 206. A clamp ring 411 attaches the hub cone 124 to drum 207 with screws 425, securing a seal 451. Circular bearing surfaces 421 and 423 are molded into the front and rear outer casings 102 and 104.

Referring to FIG. 4C, the clamp ring 411 attaches the drum 207 to the hub cone 124 with a plurality of screws 425 deforming the seal 451. The hub PCB 402 is seated on the seal 315. The push-cable 103 is seen in cross-section retained by the two-eared clamp 453 and the cable retainer 427 under the hub shield 214, which in turned is retained by a screw 433. The drum 207 contains hub cone 124 and hub shield 214. The hub PCB mount 406 deforms the seal 445 to the hub cone 124. A separate push-cable PCB 429, retained by screws such as 431, extends toward the central axis of the hub cone 124 from below the hub shield 214. A push-cable connector 435 is mounted on push-cable PCB 429 retained by screws 431 into which a push-cable plug 437 to which the push-cable conductors are joined, is inserted. Push-cable plug 437 and the conductors are retained by plastic plug retainer 439 and rubber plug seal 441. The hub PCB 402 has a header-pin connection 443 connecting push-cable PCB 429 to hub PCB 402.

In alternative embodiments of the present invention, the internal electronics could be configured to regulate power to the camera and its LEDs, provide drum rotation counting functions using magnets such as 405 and 407 (FIG. 4D) on the slip-ring assembly 300, be extended to include image capture and recording, GPS information management, a real-time clock, wireless connections to exchange data with a line and sonde locator, or transmit video images wirelessly.

Figure 4D:
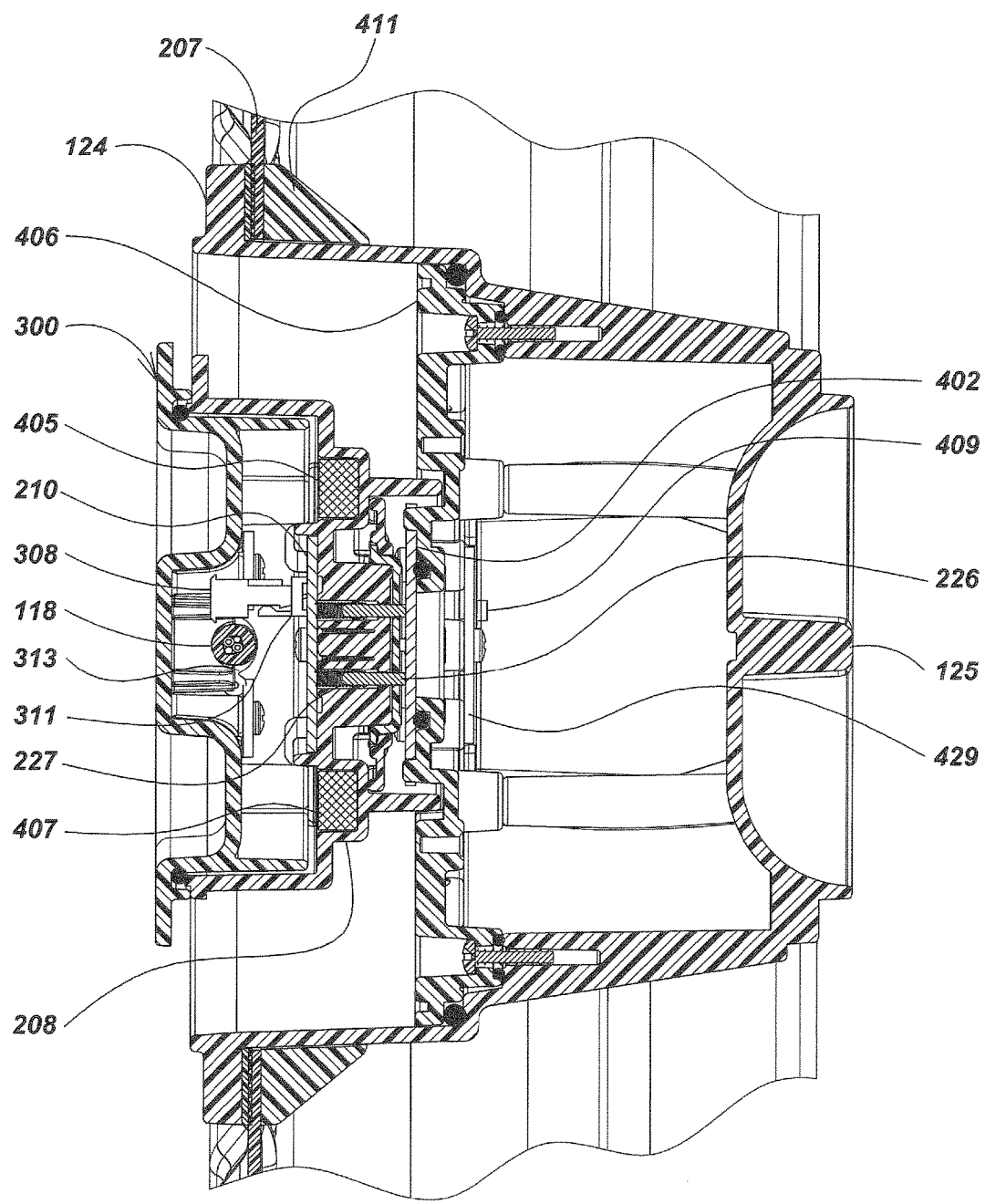
FIG. 4D is a view similar to FIG. 4B rotated to illustrate further details of the hub-cone and slip-ring connections.

Turning to FIG. 4D slip-ring assembly 300 has the system connection cable 118 in cross section secured by two-eared clamp 313 (FIG. 3B) and its leads connected to IDC female connector 308 plugged into mating connector 311 mounted on the PCB 210. In one embodiment of the present invention, the paying out of push-cable 103 (FIG. 1) occurs whenever hub cone 124 and cable storage drum assembly 206 rotate. The system enables measurement of this rotation by providing two neodymium rare-earth magnets 405 and 407 seated in provided molded recesses in slip-ring housing 208. The combined fields of magnets 405 and 407, which have the same additive orientation, are detected by at least one magnetic sensor 409 of two or more axes of detection embedded into a recess in hub cone 124 and connected electrically to a PCB such as 429 supported by hub PCB mount 406. The detection of changed angles of the composite fields from magnets 405, 407 is translated electronically into a measurement of push-cable 103 payed out of or drawn into cable storage drum assembly 206. FIG. 4D illustrates the relative locations of the PCB 210, the hub PCB 402 and push-cable PCB 429, and contact pins 226.

Figure 5A:
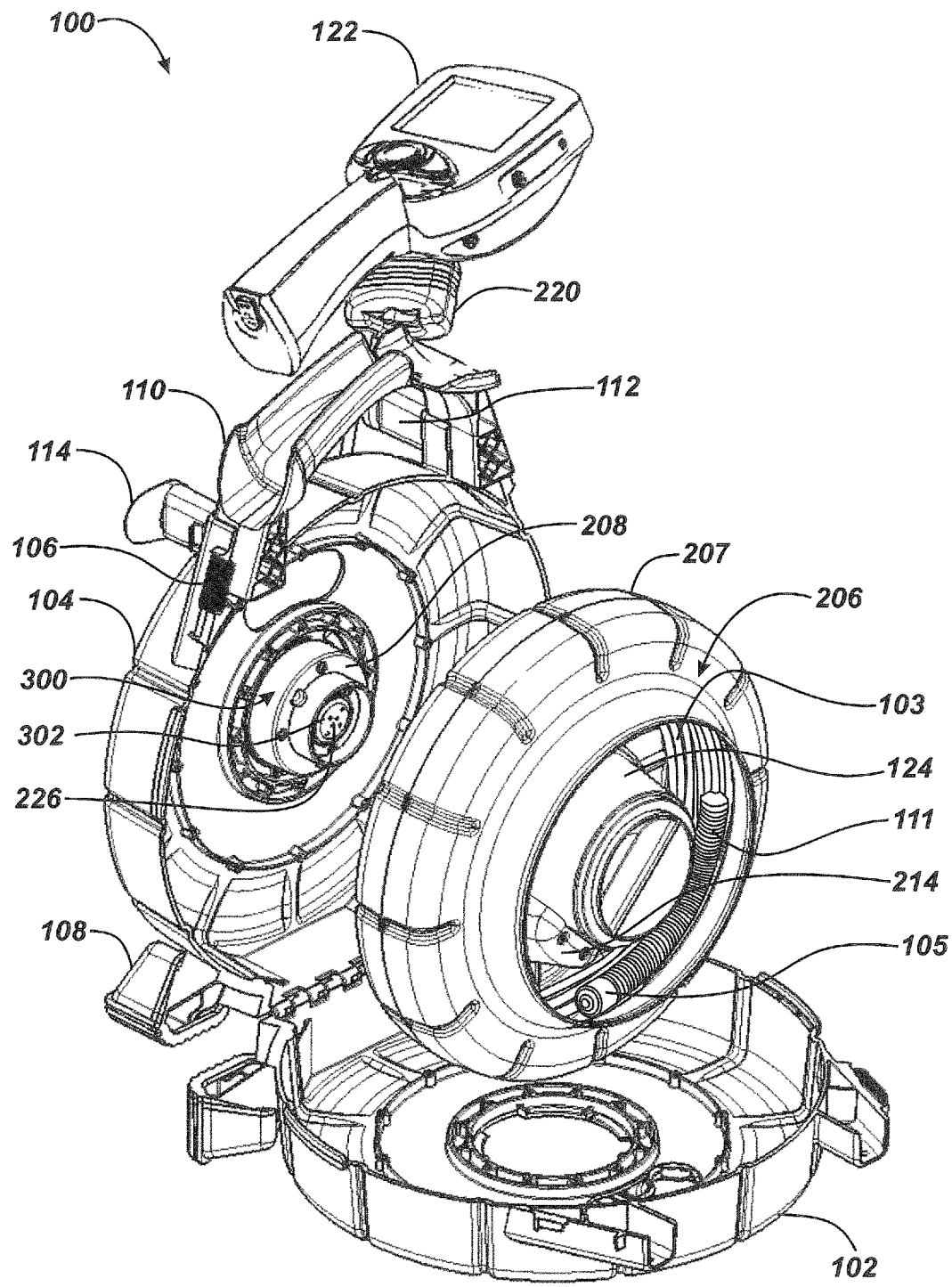
FIG. 5A is an isometric front view illustrating the clam-shell housing open and the cable storage drum moved away from the clam-shell housing.

The cross-section view of FIG. 5A further illustrates the operative mating of the two separable portions of the slip-ring mechanism of the present invention. Referring to FIG. 5A slip-ring assembly 300 is seen from the rear side of rear outer casing 104 with contact pins 226 emerging from rubber contact seal 302. Front outer casing 102 is opened to a horizontal position. Cable storage drum assembly 206 is moved part-way out from its enclosing rear outer casing 104 in order to reveal the slip-ring assembly 300 within rear outer casing 104. The cable storage drum assembly 206 contains the camera assembly 105 with coil spring assembly 111 and push-cable 103 within drum 207. The hub cone 124 and the hub shield 214 are seen within the removable cable storage drum assembly 206. On the inside of rear outer casing 104, the centrally located slip-ring housing 208 supports contact seal 302 from which spring loaded contact pins 226 emerge. Contact pins 226 are individually seated in springs detailed in FIG. 3A which are in electrical contact with the PCB 210 (FIG. 3B), associated with system connection cable 118 (FIG. 2D).

When the cable storage drum assembly 206 is removed from rear outer casing 104, the contact pins 226 from the removable system connection slip-ring assembly 300 are visible within the central region of the rear outer casing 104. In FIG. 5A, the hand-held display and image capture device 122 is shown removed from the dock handle 110. System interface plug 220 is shown not mated to the display and image capture device 122.

Figure 5B:
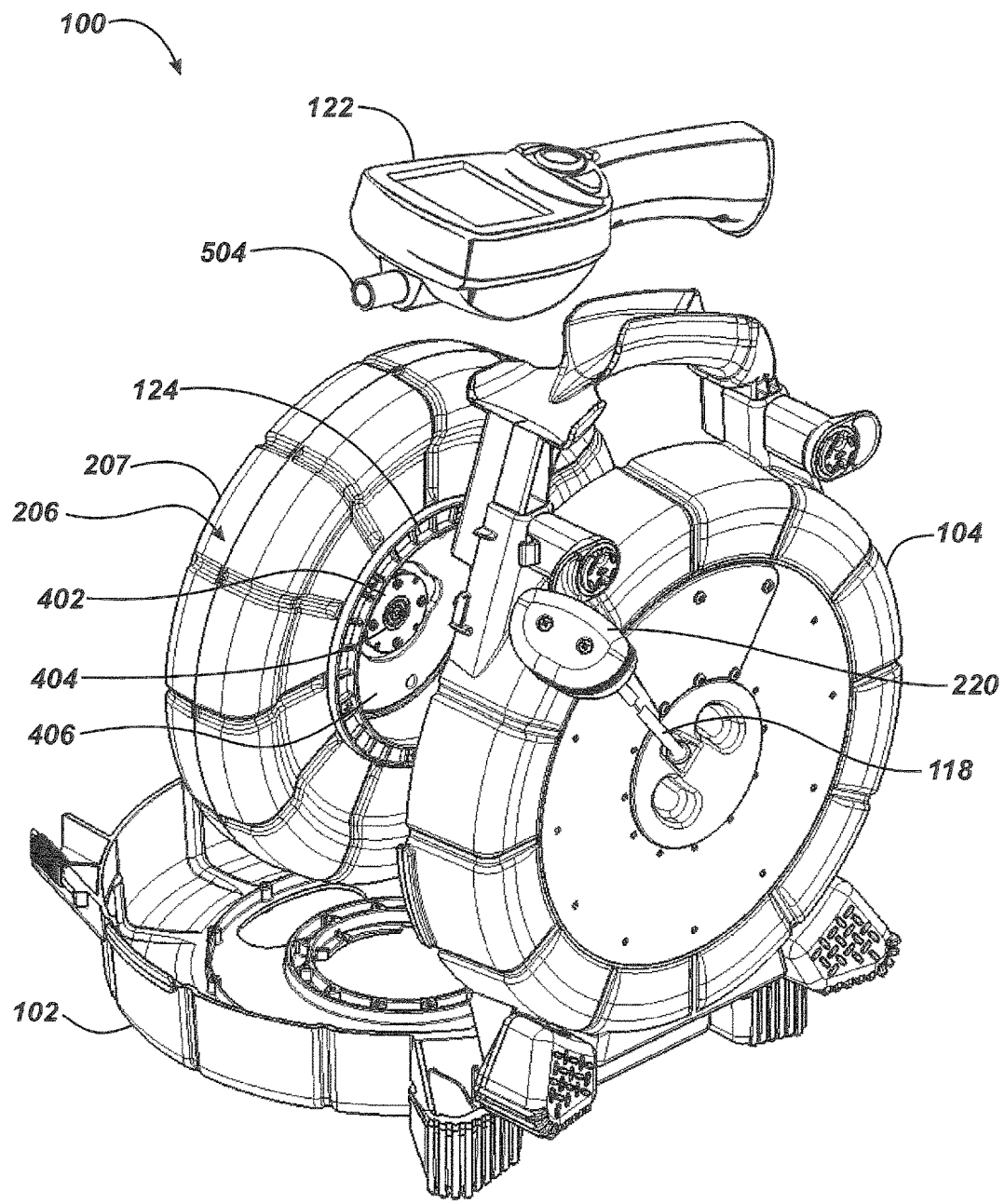
FIG. 5B is an isometric rear view similar to FIG. 5A.

Now referring to FIG. 5B, pipe inspection system 100 is viewed from the rear side outside the rear outer casing 104, with front outer casing 102 opened to a horizontal position as in FIG. 4A. The removable cable storage drum assembly 206 including drum 207 is separated herein from rear outer casing 104. In the central region of the cable storage drum assembly 206 can be seen the hub PCB 402 with three annular contact rings 404 supported by hub PCB mount 406 and the rigid structure of the hub cone 124. The annular contact rings 404 are etched onto drum-side hub PCB 402 which connects to the conductors within the push-cable 103 (FIG. 1) within the cable storage drum assembly 206, the connections being protected by the molded hub shield 214 (FIG. 2C).

System connection cable 118 connected to system interface plug 220 is shown entering the slip-ring assembly 300 (FIG. 3B). The system interface plug 220 is shown at the end of system connection cable 118 not mated with display and image capture device input connector 504 in the hand-held display and image capture device 122.

Figure 6A:
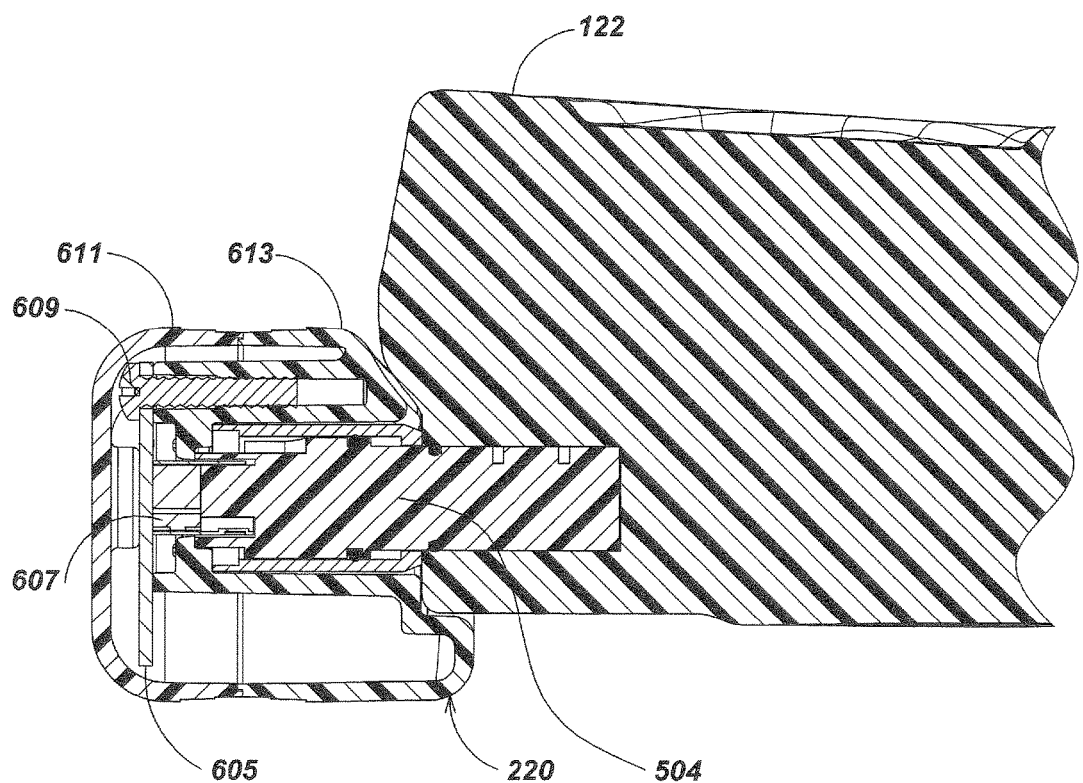
FIG. 6A is an enlarged vertical section view of the imaging device interface connector of the pipe inspection system of FIG. 1.

Referring now to FIG. 6A a vertical section of the display and image capture device input connector 504 is shown with the system interface plug 220 connected to it. A circuit board 605 inside system interface plug 220 serves as the primary link between the camera assembly 105 and the hand-held display and image capture device 122. In this example, the hand-held display and image capture device 122 is the commercially-available Perceptron® unit. Adaptation of the present invention to other display units will be readily apparent to those skilled in the art who understand the embodiments presented here.

Within the system interface plug 220, circuit board 605 converts the 5-Volt signal from the Perceptron® into a 12 Volt power supply to power the camera's internal boards and LEDs. The video information received by the camera is also fed through circuit board 605 to the Perceptron® viewing window. When the user changes certain settings on the Perceptron display and image capture device 122, this board 605 also translates these new settings to the camera assembly 105. For example, the board incorporates a boost converter to control the LEDs' brightness at the camera when the user changes brightness settings on the Perceptron®. A mini-DIN 9-pin connector 607 connects circuit board 605 display and image capture device input connector 504. Circuit board 605 and a base housing 613 are assembled and retained by screw 609.

Figure 6B:
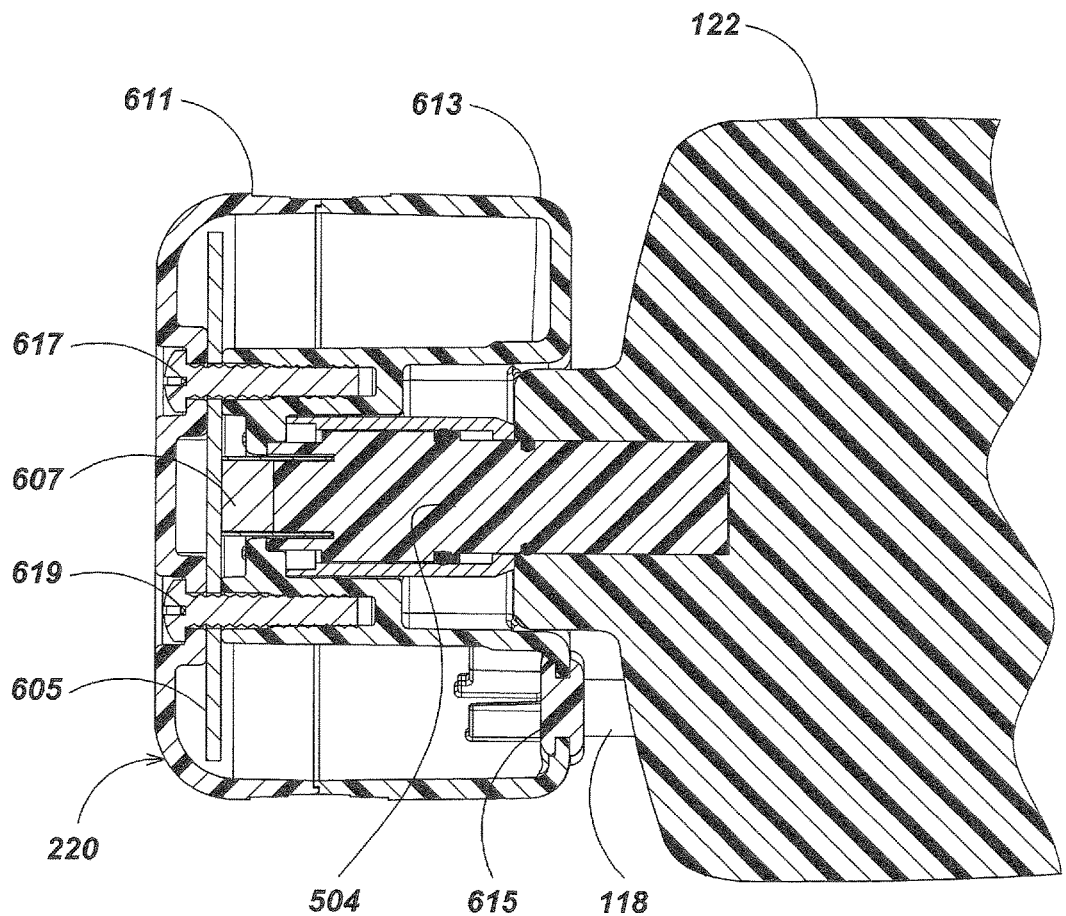
FIG. 6B is a view similar to FIG. 6A rotated ninety degrees.

Referring to FIG. 6B the system interface plug 220 is shown in a horizontal section, with system connection cable 118 entering the system interface plug 220 through rubber grommet 615. The conductors within the system connection cable 118 are then connected to circuit board 605 on which Mini-DIN connector 607 is mounted connecting to the display and image capture device input connector 504 on the Perceptron® hand-held display and image capture device 122. Additional screws 617 and 619 join the top housing 611 to the base housing 613 of the system interface plug assembly 220.

Figure 7:
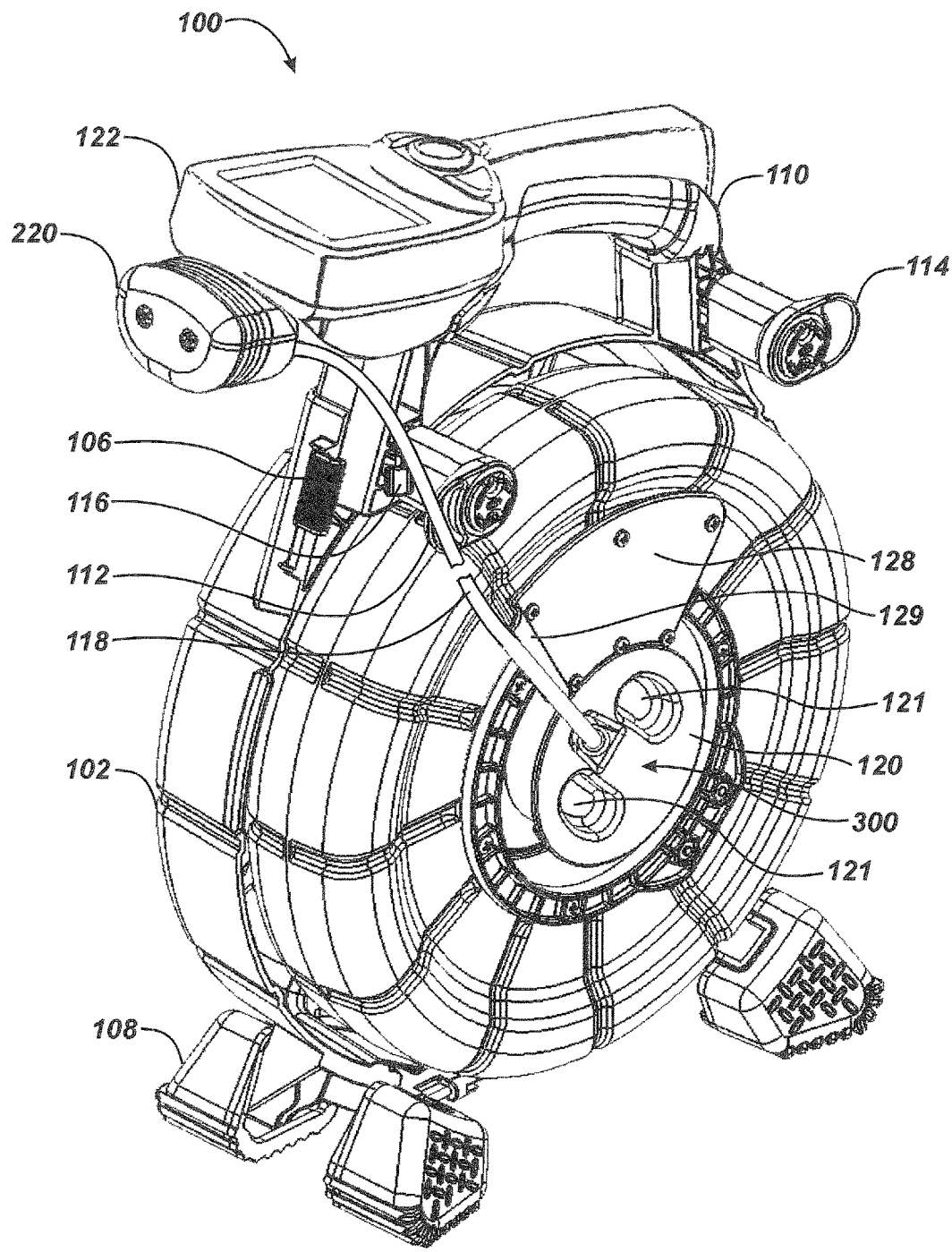
FIG. 7 is an isometric view of an embodiment of the pipe inspection system of the present invention illustrating the removable system cable and interface connector for use with a Perceptron® hand-held imaging device.

Referring now to FIG. 7, the separable slip-ring assembly 300 enables an alternative system connection cable 118 to be easily inserted to enable connection to, for example, a different video monitor. In FIG. 7 the slip-ring cover 120 is illustrated installed, and rear outer casing 104 (FIG. 5B) is removed. The system connection cable 118 in this instance is configured with a system interface plug 220 for the Perceptron® hand-held display and image capture device 122, system interface plug 220 so formed as to fit to the curve in the front of the display and image capture device 122 and connecting electronically with Perceptron® display and image capture device input connector 504 (not visible). Cover plate 128 and cable grip 129 are visible.

Figure 8A:
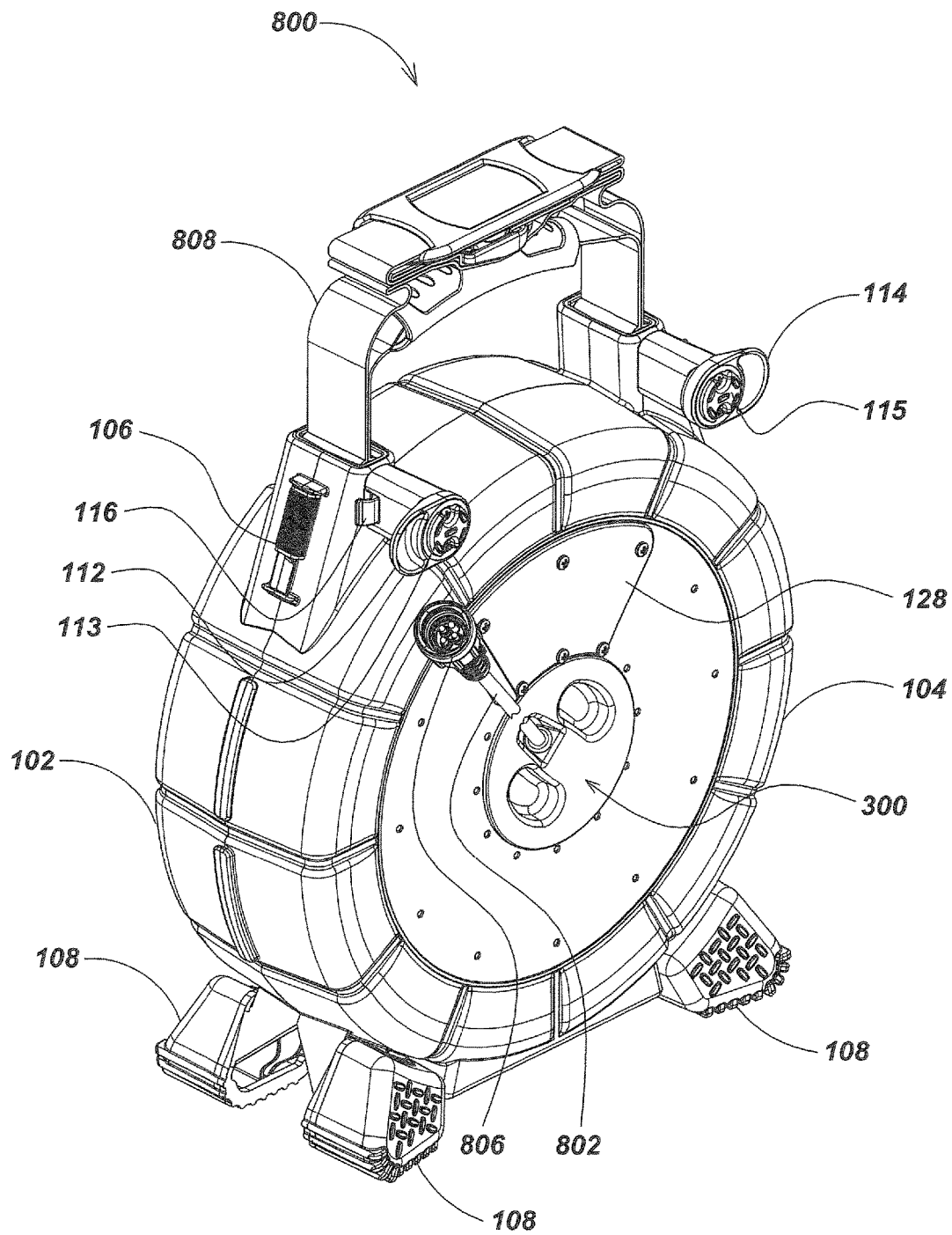
FIG. 8A is an isometric view of an alternate embodiment of the pipe inspection system of the present invention illustrating the removable system cable and interface connector for use with a SeeSnake® display device.
Figure 8B:
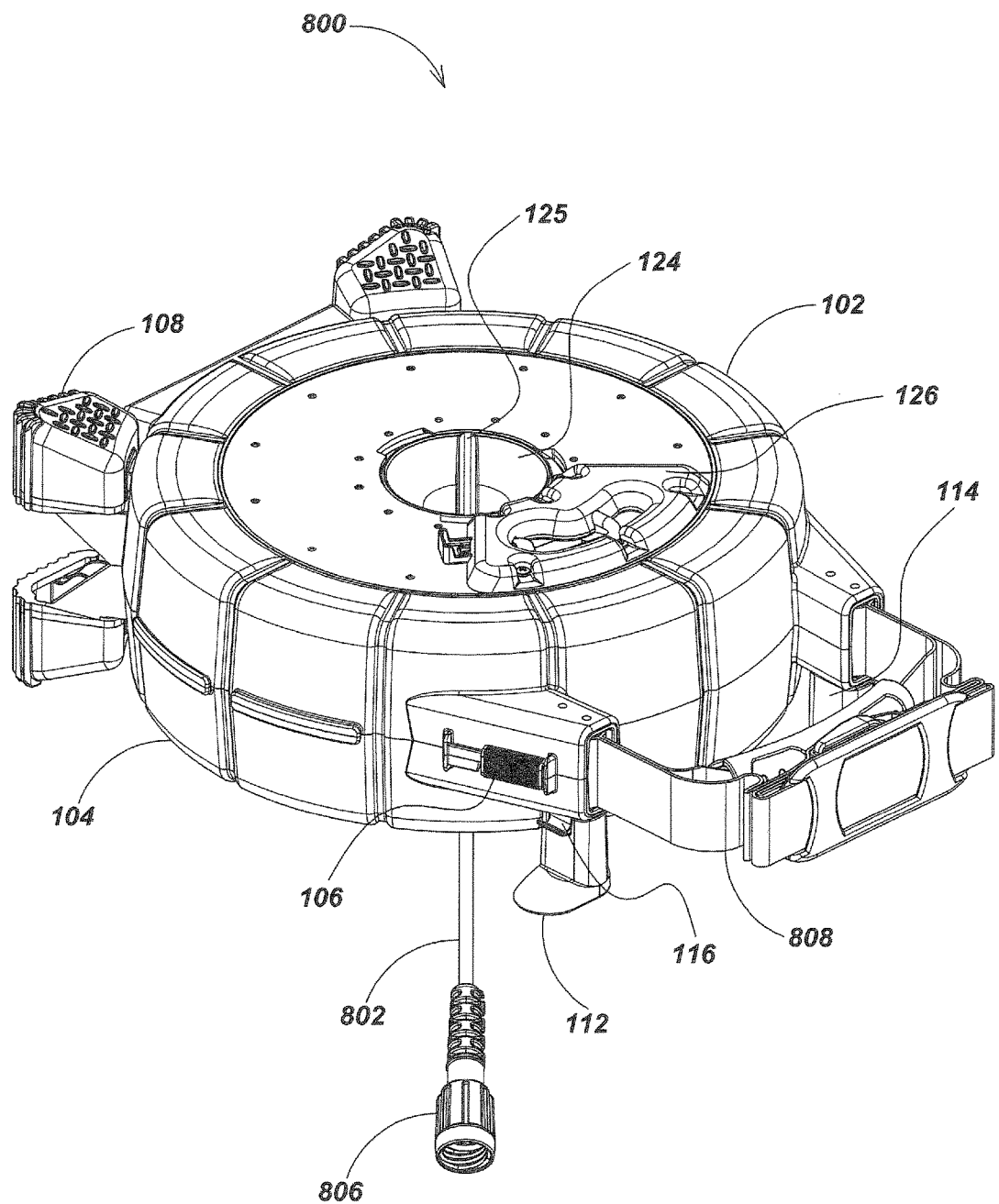
FIG. 8B is an isometric view of the pipe inspection system of FIG. 8A oriented for horizontal use with incorporated built-in feet.

Turning to FIG. 8A, an alternate embodiment of our pipe inspection system 800 has the hand-held display and image capture device 122 (FIG. 5) removed, with its system connection cable 118, and in its place a different type of system connection cable 802 has been substituted. Carrying strap 808 in its folded configuration is shown. At one end of system connection cable 802 is the slip-ring assembly 300, while at the other end a display system connector 806 for an industry-standard SeeSnake® monitor is connected. By simply rotating the slip-ring cover 120 (FIG. 3A), which is rigidly attached to the slip-ring housing 208 (FIG. 3A), the slip-ring assembly 300 may be removed from the system 800 complete with the system connection cable 802, and replaced with an alternatively configured system cable. This enables the system user to adapt the system to more than one display device by changing system connection cables.

Plastic molded feet 113 and 115, mounted on the ends of cord-wrap arms 112, 114, are aligned such that they extend outward the same distance as the snap-on molded feet 108 below them. This enables the system to be supported horizontally in use.

FIG. 8B illustrates the system 800 horizontally oriented and resting on feet 108, 113, 115 Rear outer casing 104 is now oriented downward. The display system connector 806 extends out from the slip-ring assembly (not visible) while the push-cable would normally be guided out of the front outer casing 102 through cable guide 126.

Figure 9A:
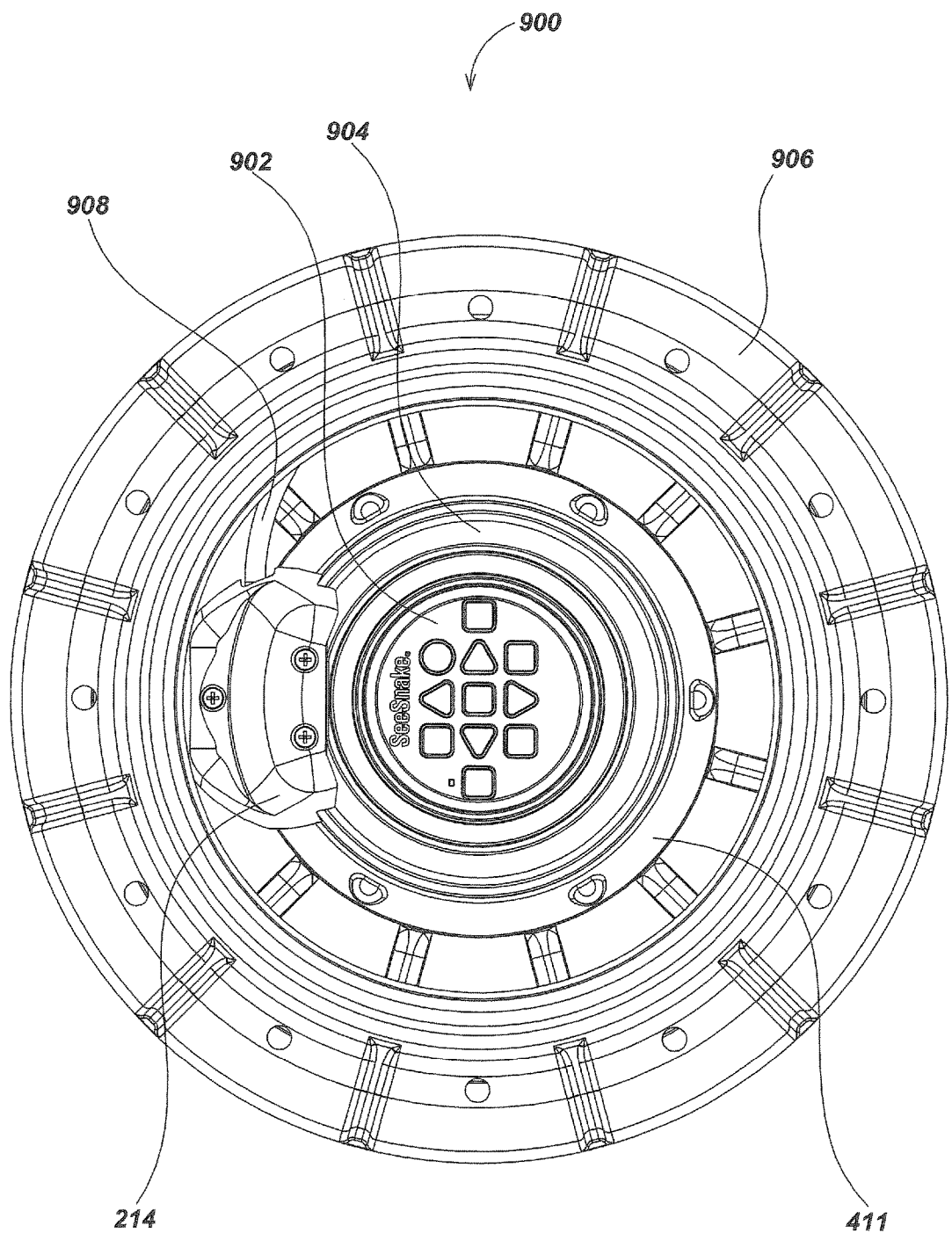
FIG. 9A illustrates a central control keypad in the hub structure utilized in an alternate embodiment.

FIG. 9A illustrates a variant of the present invention with the front shell removed for clarity. In FIG. 9A cable storage drum assembly 900 has a system control keypad 902 seated at the outer surface of the hub 904. In this embodiment, control keypad 902, using membrane switches for water-resistance, is mounted on the end face of the central molded hub 904 in such a way that it is directly accessible from without when the outer casings such as 102, 104 is closed and latched. The controls are used to set up and operate software such as distance counting software, allowing overlays of stored text, locally defined counts based on temporary zero-points and other desired information to be displayed during a pipe inspection. Push-cable 908 is stored within drum shell 906. Hub shield 214 is seated on the clamp ring 411 and serves to prevent coils of stored push-cable 908 from abrading the push-cable electrical linkage.

Figure 9B:
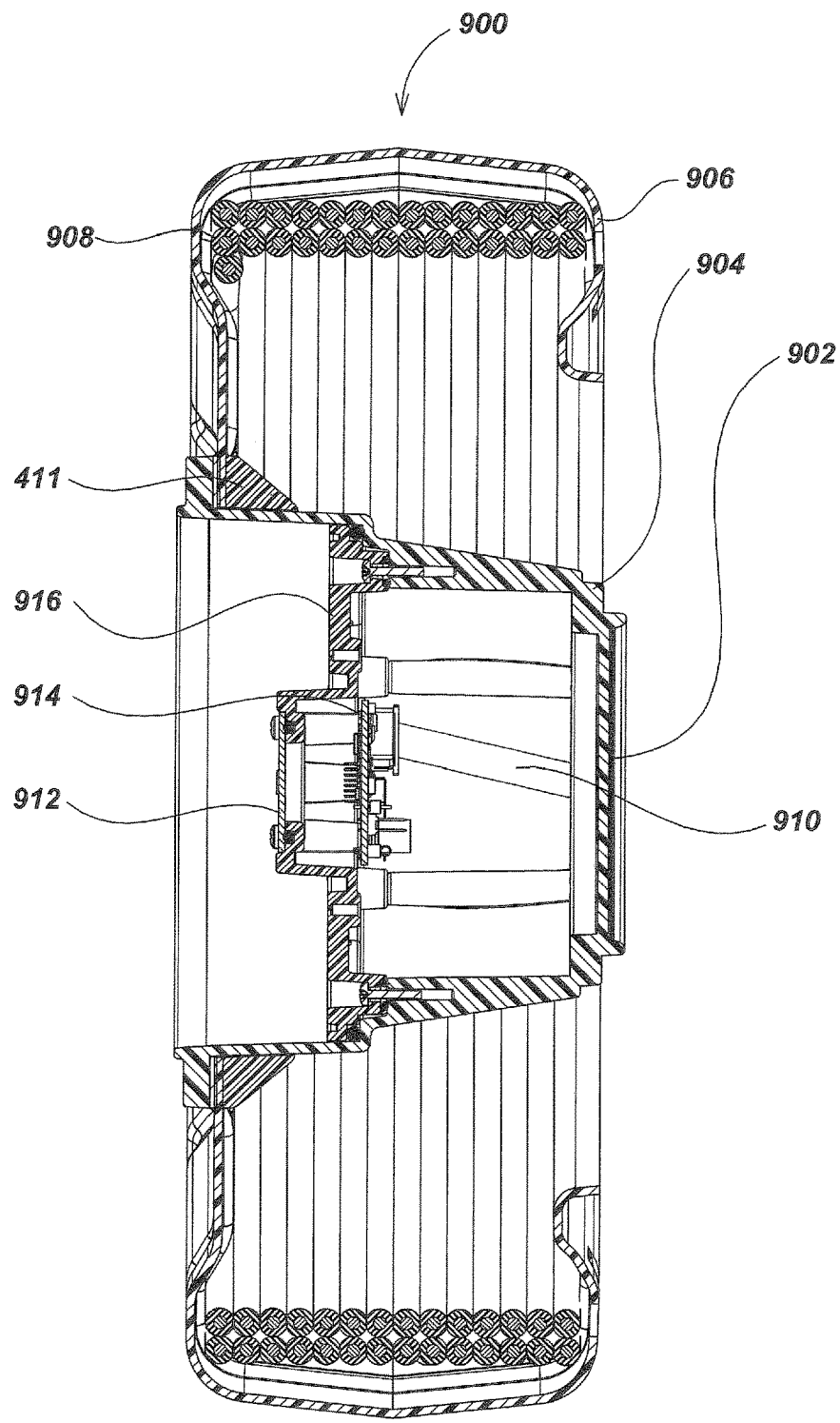
FIG. 9B is a sectional view of the hub and drum in the embodiment shown in FIG. 9A taken along line 9B-9B of FIG. 9A.

In FIG. 9B cable storage drum assembly 900 is viewed in section. Drum shell 906 contains coiled layers of push-cable 908. The control keypad 902 is mounted on the projecting face of hub 904. Ribbon cable 910 connects control keypad 902 to the counter PCB 914. Clamp ring 411 is a molded ring which retains the hub assembly. Inside hub 904 a PCB mount 916 supports a slip-ring PCB 912 on the left side of FIG. 9B, and a counter PCB 914.

Figure 10:
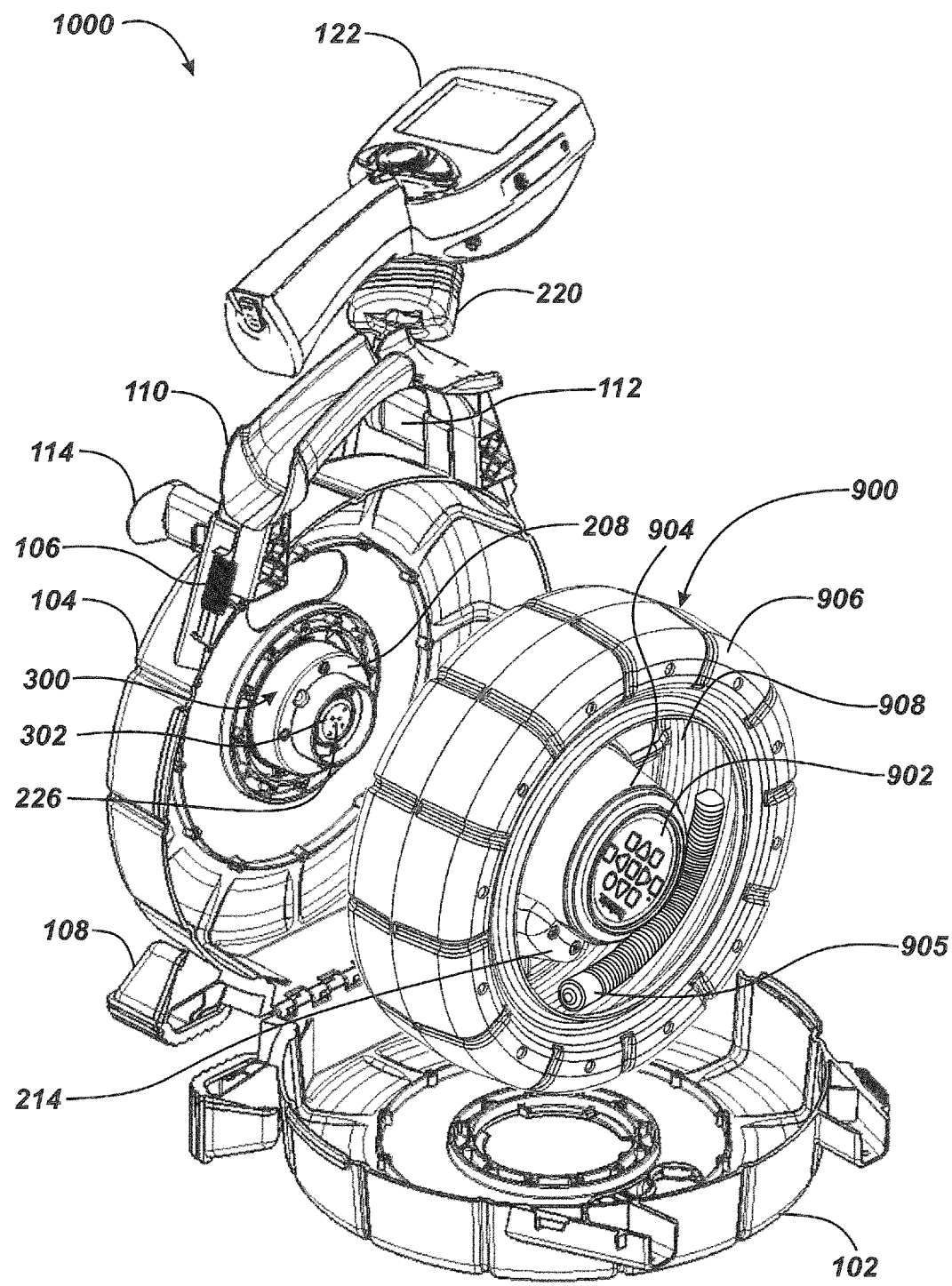
FIG. 10 is an exploded view of a system including the keypad and hub structure of FIG. 9A.

In FIG. 10, an exploded perspective view of the overall pipe inspection system 1000 is shown using the hub-key pad innovation described in FIG. 9A. Cable storage drum assembly 900, including drum shell 906 with central molded hub 904 retained therein, contains coiled stored push-cable 908 terminating in an inspection camera assembly 905. Front outer casing 102 is in its open position. Central molded hub 904 supports control keypad 902. Hub shield 214 protects the electrical linkage from the base of the push-cable to the control circuitry within the hub. Display and image capture device 122 connecting by means of interface plug 220, dock handle 110, cord-wrap arms 112, 114, latch 106, rear outer casing 104, slip ring assembly 300, seal 302, contact pins 226, slip-ring housing 208, are as described in the embodiment shown in FIGS. 2C, 2D, and 2E. The slip-ring configuration is modified in this embodiment to accommodate the sensing magnets as shown in FIG. 11A.

Note that the cable storage drum assembly 900, push-cable 908 and camera assembly 905 of the pipe inspection system 1000 in. FIG. 10 are a different specification than the drum, cable and camera in FIGS. 1 and 5A, with a longer and slightly stiffer push-cable 908, a larger camera assembly 905, and the addition of the keypad 902. The simple replacement of the drum in the clamshell case advantageously allows the user to rapidly deploy a different system for different purposes, such as inspecting a longer run of pipe, for example, with less constrained turns in it.

Figure 11A:
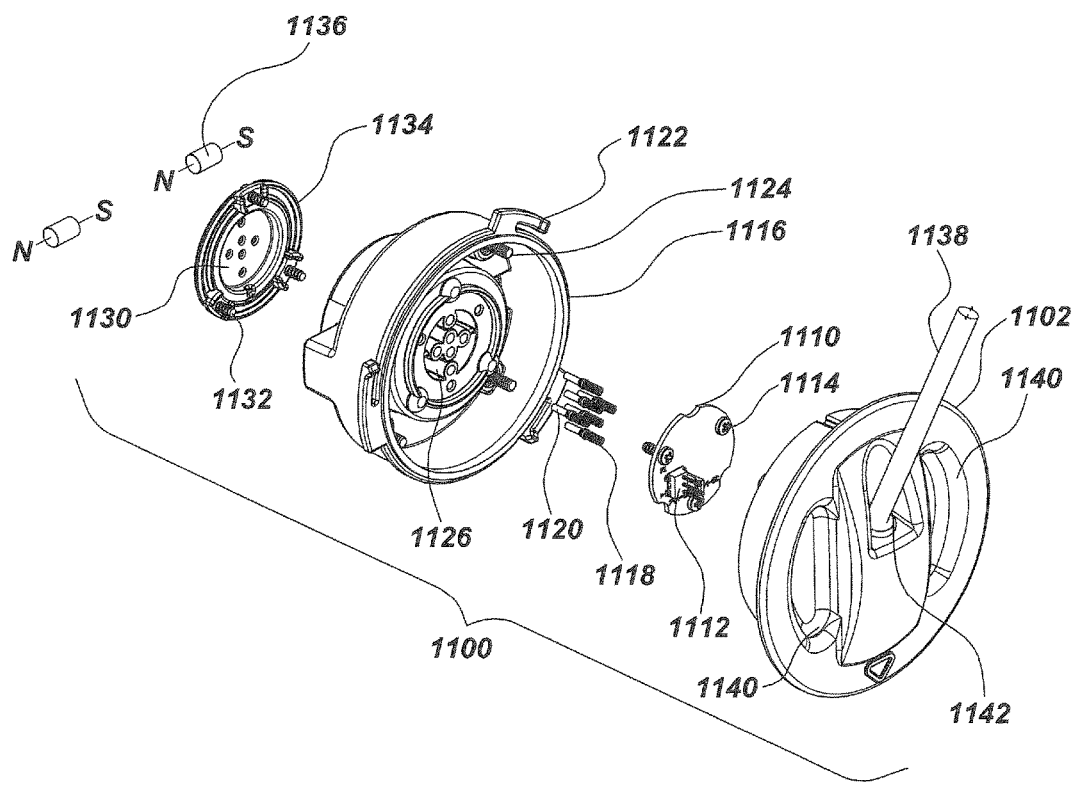
FIG. 11A is an exploded view of an alternate embodiment of the slip-ring module with external pockets for the sensing magnets.
Figure 11B:
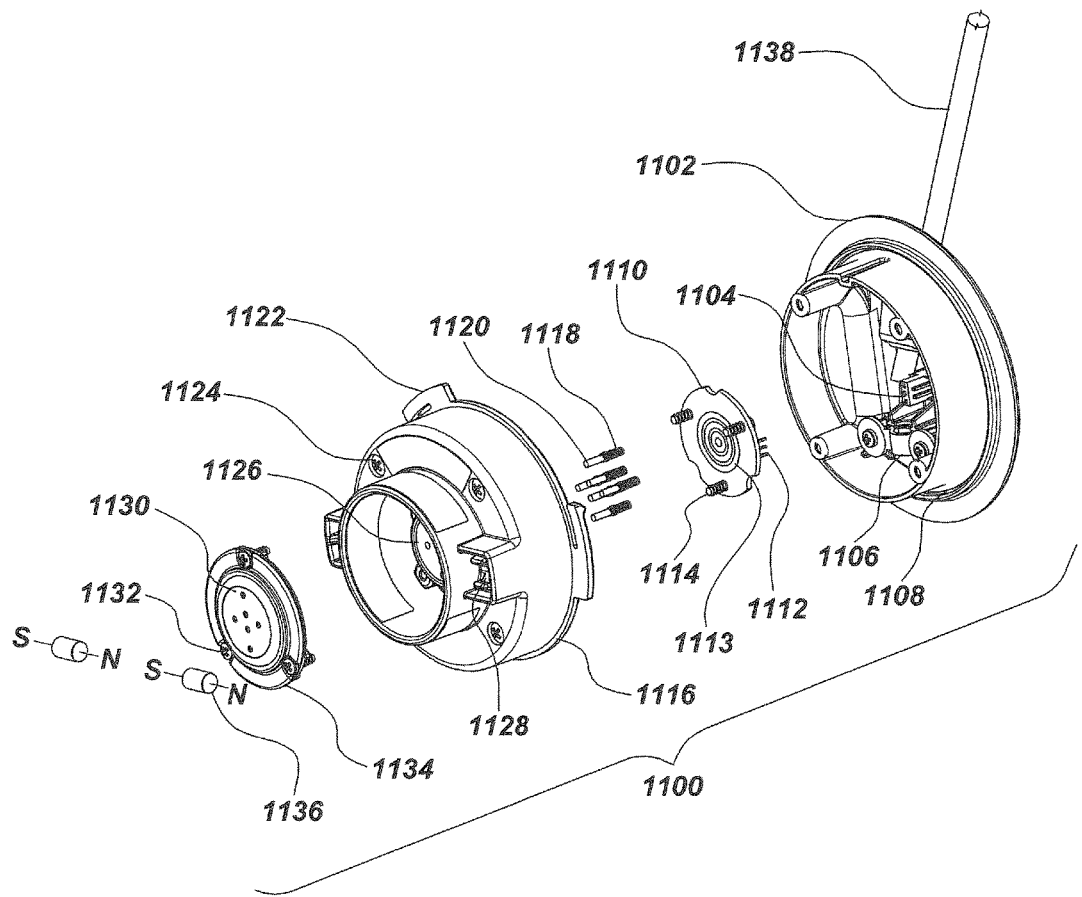
FIG. 11B illustrates the module of FIG. 11A from the opposite side perspective.
Figure 11C:
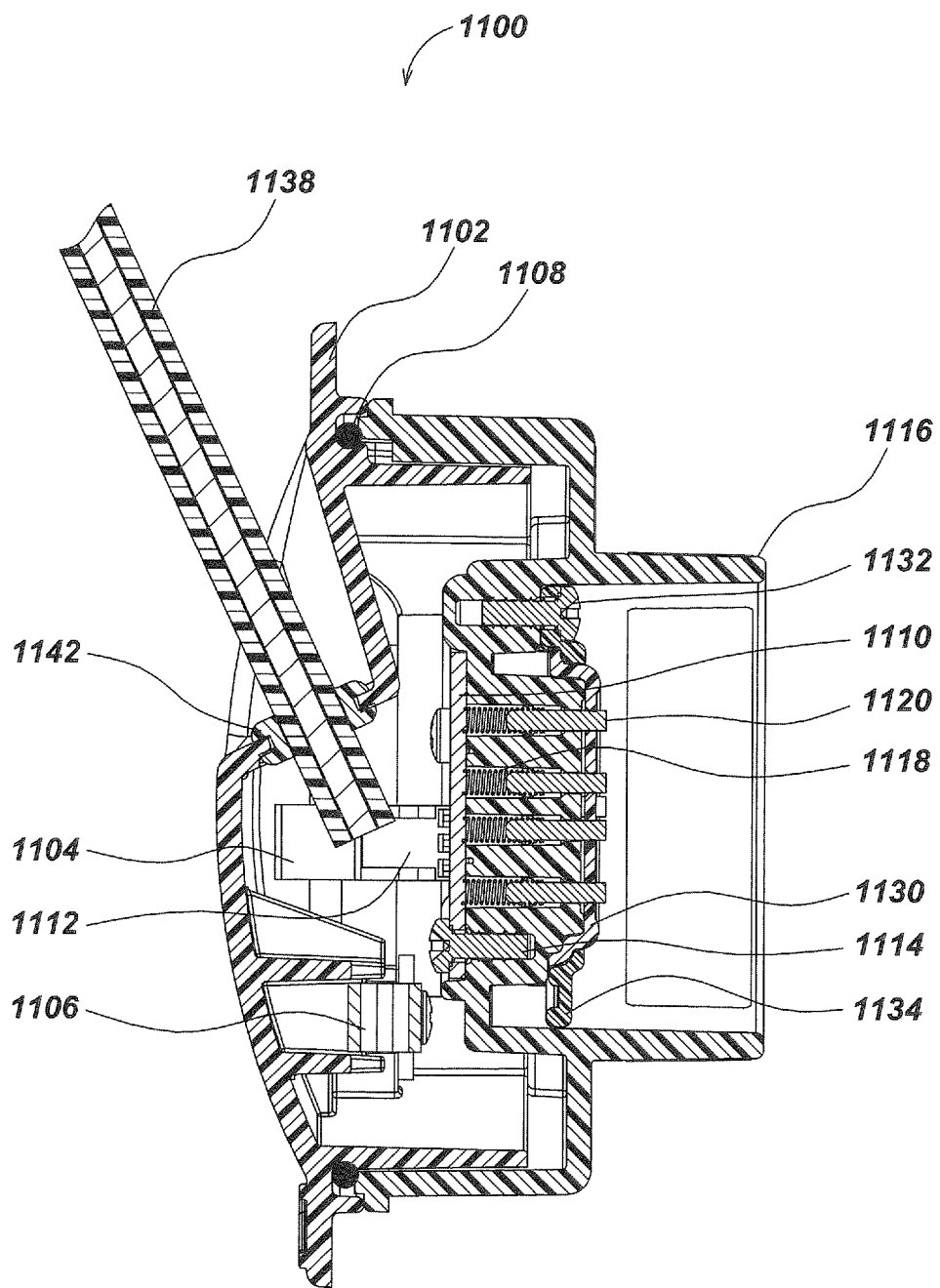
FIG. 11C is a section view of the module of FIGS. 11A and 11B.

In FIGS. 11A and 11B, system connection cable 1138 leading from the hand-held display and image capture device 122 (FIG. 10) enters the slip-ring cover 1102 through an opening between the two grip recesses 1140, and passes through a grommet 1142. The system connection cable 1138 is secured onto slip-ring cover 1102 by, for example, a two-eared clamp 1106 (FIG. 11B), and its conducting leads are connected electrically to a female plug 1104 (FIG. 11B). The female plug 1104 mates with a three-pin IDC male connector 1112 mounted on the back side of a fixed PCB 1110. Three annular contact rings 1113 are formed on the front side of the PCB 1110 and lead to the pins of IDC male connector 1112 on the back. Six contact pins 1120 of a graphite-silver compound are biased by corresponding gold-plated springs 1118. Springs 1118 contact against the three annular contact rings 1113, two on each of the contact rings 1113. The use of dual spring-loaded contacts for each of the annular contact rings 1113 reduces contact noise in the transmission of electrical signals. The contact pins 1120 and springs 1118 are mounted in corresponding cylindrical sleeves 1126 molded in a central wall portion of a cylindrical slip-ring housing 1116. Contact pins 1120 and springs 1118 are retained in cylindrical sleeves 1126 by a rubber contact seal 1130 and a retainer 1134. Rubber contact seal 1130 is designed so that it seals the contact pins 1120 in a water-tight fashion as they pass through the rubber contact seal 1130. The slip-ring housing 1116 is formed with peripheral locking keys such as 1122 which are engaged by mating features on the rear outer casing 104 (FIG. 10). The slip-ring assembly 1100 can be manually inserted and twist-locked into the center of the rear outer casing 104 (FIG. 10). The outer casings 102 and 104 of the clam-shell housing can then be latched together. The contact pins 1120 are then held by the force of the springs 1118 in electrical contact with a plurality of contact rings on slip-ring PCB 912 (FIG. 9B) within the cable storage drum hub 904 providing conductive paths between the push-cable 908 and the system connection cable 1138. Magnets 1136 are seated in pockets 1128 formed into slip-ring housing 1116 and retained therein by inserted clips. Screws 1124 attach slip-ring housing 1116 to slip-ring cover 1108. Screws 1132 attach retainer 1134 inside a protective well formed in slip-ring housing 1116, FIG. 11C illustrates in a section view the joining of system connection cable 1138 to the slip-ring assembly 1100 after the system connection cable 1138 passes through a sealing grommet 1142. The electrical leads of the system connection cable 1138 are attached to female plug 1104 and thus to the pins of IDC male connector 1112. Slip-ring cover 1102 forms a seal with O-ring 1108. Contact pins 1120 are connected to the inputs from system connection cable 1138 and female plug 1104 by means of PCB 1110 and are tensioned in contact with the hub annular contact rings by springs 1118. Rubber contact seal 1130 through which the contact pins 1120 protrude serves to seal the pins against dust or moisture. PCB 1110 is attached by screws 1114 to slip-ring housing 1116.

In the preferred embodiments camera assembly 905 (FIG. 10) or camera assembly 105 (FIG. 1) has a small built-in dipole sonde transmitter. In some embodiments, the camera may be replaced with a high-powered dedicated sonde unit whose higher power transmissions allow the sonde to be located in more remote or more shielded locations when down-pipe, using a standard locator. In some embodiments the replacement unit may be a smaller dedicated sonde unit able to fit into smaller spaces into which the standard camera head cannot fit. In such embodiments, the cable with a dedicated sonde attachment may be installed in a removable cable storage drum assembly such as 900 (FIG. 10).

Figure 12:
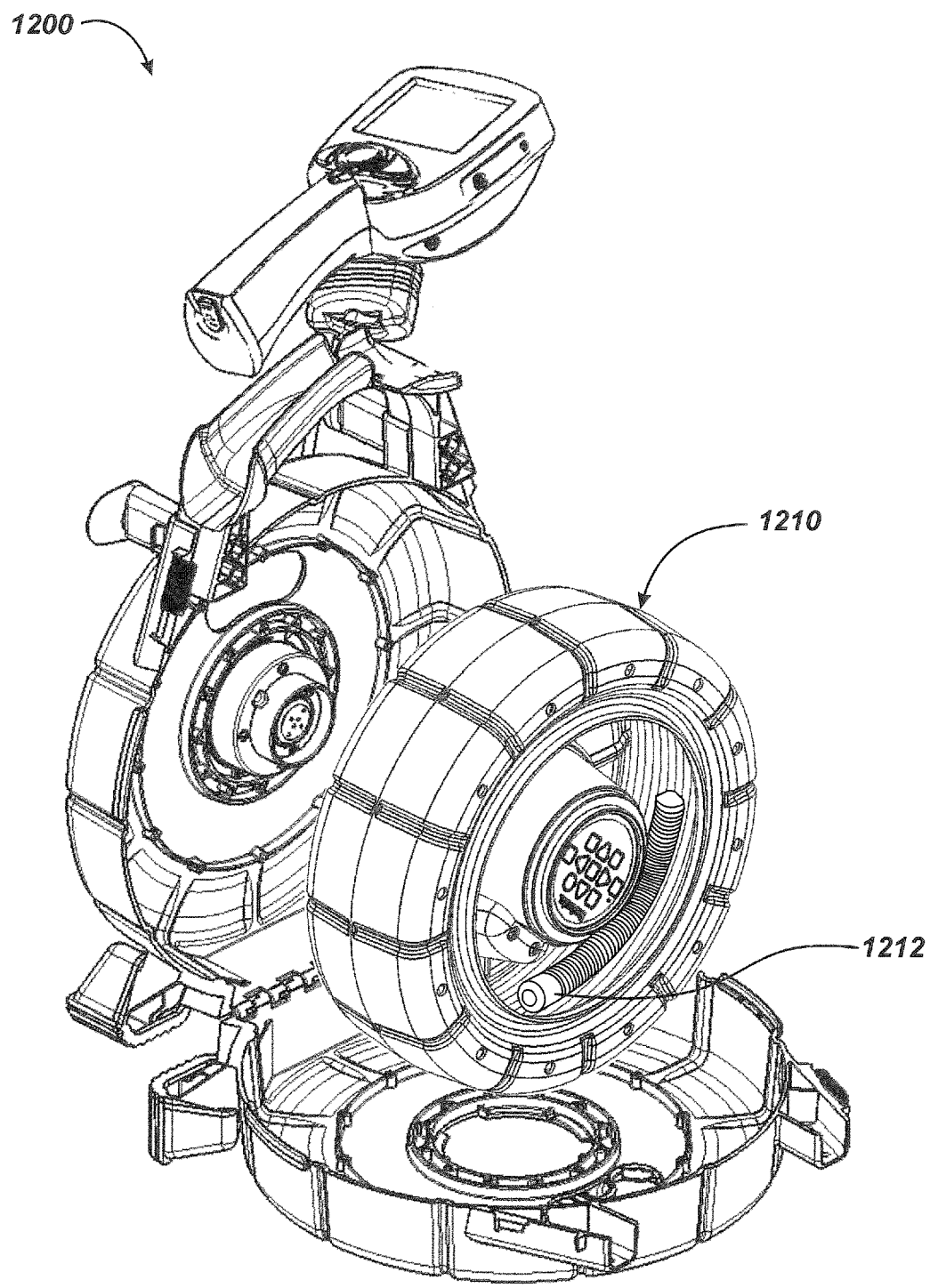
FIG. 12 illustrates an alternate embodiment that uses a replaceable drum carrying a sonde instead of a camera assembly at the distal end of the cable.

A cable with a dedicated sonde attached may be designed in some embodiments to enable a line-locating frequency such as 33 kHz to be transmitted along it while the sonde is also operating, thus allowing a locator operator to trace the line and locate the sonde at the end of it in a single operation using an appropriately designed locator. In such as embodiment the sonde may be in always-on configuration rather than switchable from the keypad 902. Any one of these configurations may be built into a replaceable drum assembly and rapidly mounted into or removed from the clamshell case of the present invention to suit the needs of the operator. In FIG. 12, system 1200 includes cable storage drum assembly 1210 in which the cable is connected to a dedicated sonde head 1212 rather than a camera head. Sonde head 1212 provides a more powerful sonde transmission to enable locating the head in deeper or more shielded locations. Alternatively, a sonde head designed for minimum size may be used allowing the sonde to reach into areas too confined for a standard camera head. Because the drum assembly 1210 is readily removable and replaceable, a special-purpose drum assembly such as 1210 as shown in FIG. 12 is advantageously easy to deploy when needed in inspection and location operations.

Figure 13A:
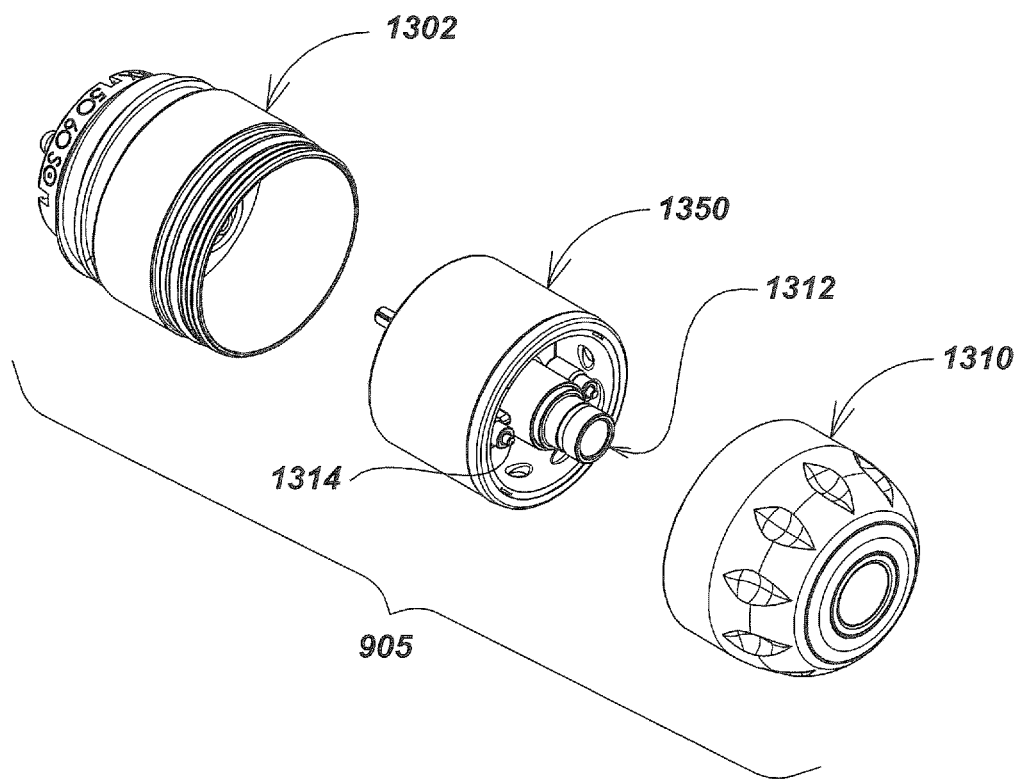
FIGS. 13A and 13B are views illustrating a Sonde construction integrated into the camera head of an inspection system.
Figure 13B:
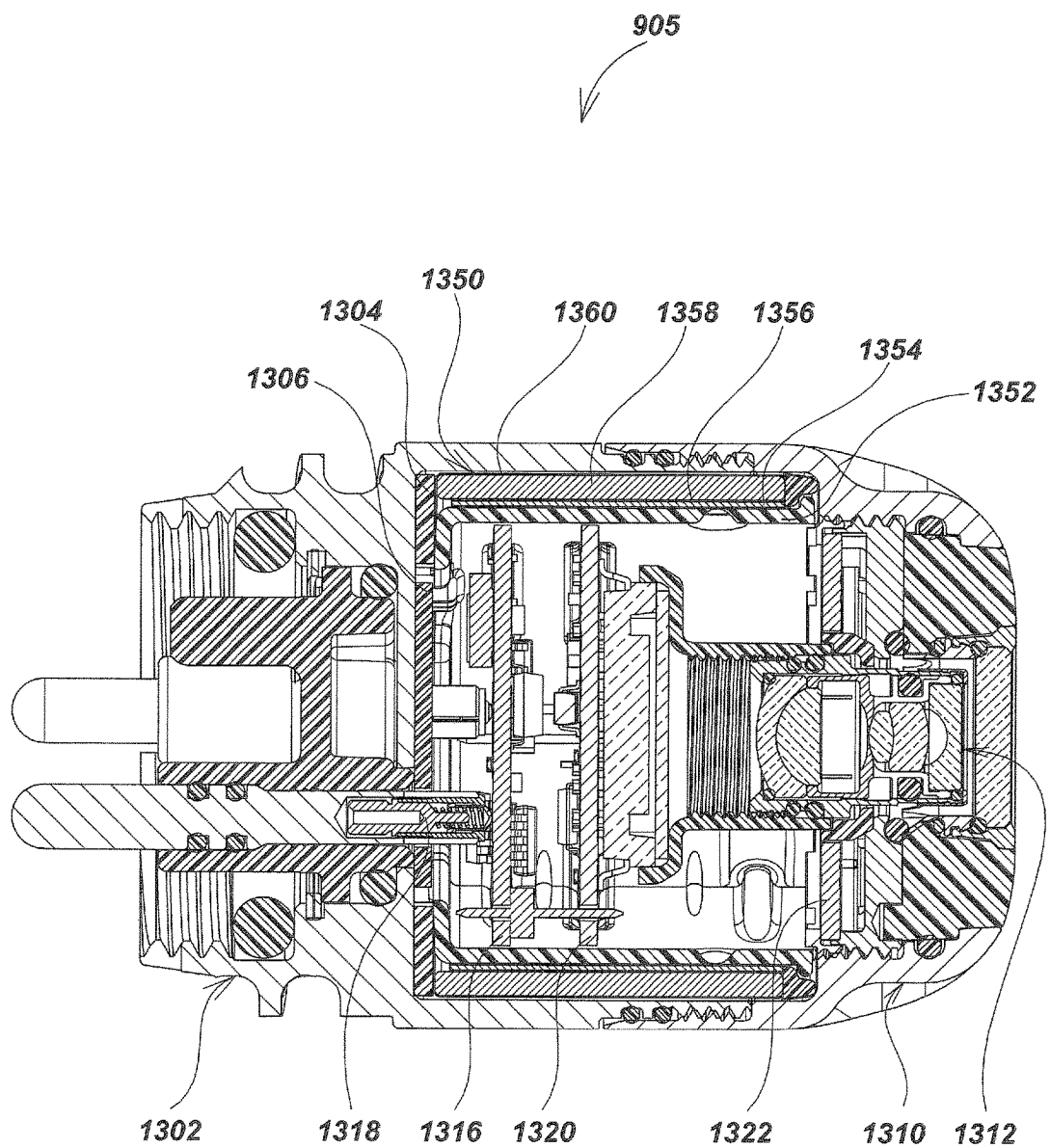

In some embodiments of the present invention the dipole sonde transmitter may be built into the camera head construction. In FIG. 13A and FIG. 13B the construction of the sonde relative to the camera head is visible. Several innovative principles are illustrated by means of which the built-in sonde can be constructed with a minimal footprint in order to enable the smallest possible camera diameter for the inspection system while retaining Sonde transmission power. In FIG. 13A the camera assembly 905 is illustrated in a partially exploded view in which camera window assembly 1310 and rear casing 1302 have been moved away from the sonde assembly 1350. It will be noted that sonde assembly 1350 is constructed substantially surrounding camera module 1312, creating an advantageously compact footprint. Sonde bobbin 1352 is a plastic shell formed of two halves which lock into place around the lens assembly and camera module 1312. A core of Metglas 1354 laid into a tubular form is wound onto the sonde bobbin 1352 and sealed into place with a layer of Kapton tape 1356. The Metglas core 1354 serves to maximize the power of the coil's transmission when energized by acting as a high-permeability core which enhances field strength. Sonde coil 1358 likewise substantially surrounds the camera module 1312. The Metglas core 1354 is preferably formed from Metglas 2714A annealed alloy tape rolled into a tubular configuration that also surrounds the camera module 1312. The Metglas alloy incorporated in this tape is a metallic glass alloy that differs from traditional metals in that it has a non-crystalline structure and possess unique physical and magnetic properties that combine strength and hardness with flexibility and toughness. The bonded sonde coil 1358 is situated around the layer of Kapton 1356. A layer of shrink-tubing 1360 is positioned and made to shrink into place around the sonde coil 1358. The housing of the sonde is preferably made of a material of low conductivity and low magnetic permeability to minimize eddy current losses and avoid shunting the field. When powered under the control of a circuit mounted on the camera circuit board 1320, the sonde emits a 512 Hz frequency, for example. The integrated sonde allows the axial length of the sonde coil 1358 to be minimized while still providing adequate radiated signal strength for underground locating operations.

In addition to the improved form-factor achieved by building the sonde around the camera module 1312, additional improvements in the design of the camera's power transmission system may be seen in FIGS. 13A and 13B. Spring-loaded pins 1314 (FIG. 13A) on either side of the camera module 1312 transfer power to the LEDs via a circuit board 1322 within the front bezel and window assembly 1310. Additional spring-loaded pins 1318 transfer power from the rear connectors of the camera head assembly to the CMOS PCB 1316 which is connected as well to the camera circuit board 1320. The use of spring-loaded pins 1314 and 1318 allows the camera head to be rapidly disassembled for repair as it obviates the need for unplugging connectors and reduces the form factor of the assembly.

Clearly, other embodiments and modifications of this invention may occur readily to those of ordinary skill in the art in view of these teachings. For example, in a converse alternative embodiment of the pipe inspection system 100 (FIG. 1, et al.) the spring biased contact pins 226 of the slip-ring assembly 300 (FIGS. 3A, 3B) could be mounted to the slip-ring cover, for example, and the contact rings 306 could be mounted in the slip-ring housing 208. It is advantageous to put the spring pins on the cable side of the interface as the single PCB is easier to seal, and doing so enables the use of interchangeable drums, for example using different types of cable assemblies.

While embodiments of the present invention have been described in detail, modifications and adaptations thereof will occur to those skilled in the art of designing pipe inspection systems. For example the basic system could have a converse configuration in which the contact rings are mounted on the cable storage drum and the contact pins are mounted on the housing. Therefore, the protection afforded this invention is to be limited only by the following claims, which include all such embodiments and modifications when viewed in conjunction with the above specification and accompanying drawings.

We claim:

1. A pipe inspection system, comprising:
   a substantially round-shaped cable storage drum;
   a substantially round-shaped housing configured to removably receive and rotatably support the cable storage drum;
   a push-cable with a plurality of conductors, the push-cable being stored in the cable storage drum in a plurality of coils;
   a camera head operatively connected to a distal end of the push-cable;
   a removable handheld display and image capture device coupled to the push-cable conductors for displaying images or video provided from the camera head; and
   a slip-ring assembly having first and second mating portions that when mated provide conductive paths from the plurality of conductors at a proximal end of the push cable, the first portion of the slip-ring assembly being mounted on the housing and the second portion of the slip-ring assembly being mounted on the removable cable storage drum.

2. The system of claim 1 wherein the first portion of the slip-ring assembly includes a plurality of contact rings and the second portion of the slip-ring assembly includes a plurality of contact pins that are aligned with corresponding contact rings when the first and second portions of the slip-ring assembly are mated.

3. The system of claim 2 wherein the cable storage drum has an axially projecting central hub, wherein the plurality of contact rings are disposed on the axially projecting central hub.

4. The system of claim 1 wherein the housing includes first and second outer casings that are hingedly connected to open in clam shell fashion.

5. The system of claim 2 wherein the second portion of the slip-ring assembly further includes a plurality of springs for biasing the contact pins into engagement with corresponding contact rings.

6. The system of claim 1 and further comprising a dock handle for seating the handheld display and image capture device.

7. A pipe inspection system, comprising:
   a cable storage drum;
   a housing configured to removably receive and rotatably support the cable storage drum;
   a push-cable with a plurality of conductors, the push-cable being stored in the cable storage drum in a plurality of coils;
   a camera head operatively connected to a distal end of the push-cable; and
   a slip-ring assembly having first and second mating portions that when mated provide conductive paths from the plurality of conductors at a proximal end of the push cable, the first portion of the slip-ring assembly being mounted on the housing and the second portion of the slip-ring assembly being mounted on the removable cable storage drum;
   a display device coupled to the push-cable conductors for displaying images or video provided from the camera head;
   and further comprising a removable system connection cable configured to relay information from the slip-ring assembly to the display.

8. The system of claim 1 wherein the camera head includes a dipole sonde transmitter.

9. A pipe inspection system, comprising:
   a cable storage drum;
   a housing configured to removably receive and rotatably support the cable storage drum;
   a push-cable with a plurality of conductors, the push-cable being stored in the cable storage drum in a plurality of coils;
   a camera head operatively connected to a distal end of the push-cable; and
   a slip-ring assembly having first and second mating portions that when mated provide conductive paths from the plurality of conductors at a proximal end of the push cable, the first portion of the slip-ring assembly being mounted on the housing and the second portion of the slip-ring assembly being mounted on the removable cable storage drum;
   wherein the camera head includes a dipole sonde transmitter and wherein the sonde transmitter includes a tubular core of a metallic glass alloy.

10. The system of claim 1 wherein the camera head includes at least one printed circuit board, a plurality of rear connectors and a plurality of spring-loaded pins that provide electrical connections between the rear connectors and the printed circuit board.

11. A removable push-cable cable storage drum, comprising:

an annular drum with a hollow interior;
a resilient flexible push-cable with a plurality of conductors stored in coils in the interior of the drum;
a camera head operatively connected to a distal end of the push-cable;
a handheld display and image capture device coupled to the push-cable conductors for displaying images or video provided from the camera head; and
a first portion of a slip-ring assembly mounted on the drum, the slip ring assembly having a second portion that when mated with the first portion provides conductive paths from the plurality of conductors at a proximal end of the push-cable.

12. The push-cable storage drum of claim 11 wherein a first portion of the slip-ring assembly includes a plurality of contact rings and a second portion of the slip-ring assembly includes a plurality of contact pins that are aligned with and engage corresponding contact rings when the first and second portions of the slip-ring assembly are mated.

13. The push-cable storage drum of claim 12 wherein the contact pins are carried by the annular drum.

14. The push-cable storage drum of claim 11 wherein the annular drum includes an axially projecting hub encircled by the coils of the push-cable.

15. The push-cable storage drum of claim 12 wherein the slip-ring assembly further includes a plurality of springs positioned to bias the contact pins into engagement with corresponding contact rings.

16. A removable push cable storage drum, comprising:
an annular drum with a hollow interior;
a resilient flexible push-cable with a plurality of conductors stored in coils in the interior of the drum;
a camera head operatively connected to a distal end of the push-cable;
a first portion of a slip-ring assembly mounted on the drum, the slip ring assembly having a second portion that when mated with the first portion provides conductive paths from the plurality of conductors at a proximal end of the push-cable; and
a removable system connection cable configured to relay information from the slip-ring assembly to a display device.

17. The push-cable storage drum of claim 11 wherein the camera head includes a dipole sonde transmitter.

18. The push-cable storage drum of claim 17 wherein the sonde transmitter includes a tubular core of a metallic glass alloy.

19. The push-cable storage drum of claim 11 wherein the camera head includes at least one printed circuit board, a plurality of rear connectors and a plurality of spring loaded pins that provide an electrical connection between the rear connectors and the printed circuit board.

20. The push cable storage drum of claim 11 wherein the drum has a centrally mounted hub and a control keypad mounted on a projecting face of the hub.

21. A pipe inspection system, comprising:
an annular cable storage drum having an axially extending central hub;
a housing including first and second outer casings that are hingedly connected to open in clam shell fashion to define an interior and configured to removably receive and rotatably support the cable storage drum;
a resilient flexible push-cable with a plurality of conductors stored in the cable storage drum in coils that surround the central hub of the cable storage drum;
a camera head operatively connected to a distal end of the push-cable;
a display coupled to the push-cable conductors for displaying images or video provided from the camera head;
a slip-ring assembly having first and second mating portions that when mated provide conductive paths from the plurality of conductors at a proximal end of the push cable, the first mating portion of the slip-ring assembly being mounted on the housing and the second mating portion of the slip-ring assembly being mounted on the removable cable storage drum, one of the first and second mating portions of the slip-ring assembly including a plurality of contact rings and the other one of the mating first and second portions of the slip-ring assembly including a plurality of contact pins that are aligned with and spring biased into engagement with corresponding contact rings when the first and second portions of the slip-ring assembly are mated; and
a removable system connection cable configured to relay information from the slip-ring assembly to the display.

22. The system of claim 1 further including a docking handle on the housing for attaching the display device.

23. The system of claim 1 wherein the first portion of the slip-ring assembly is configured to be removably coupled to the housing.

24. The system of claim 23 wherein the slip-ring assembly includes one or more locking keys for removably locking the first portion of the slip-ring assembly to the housing.

25. The system of claim 2 wherein the contact pins include two or more contact pins for each of the plurality of contact rings.

26. The system of claim 4 wherein the first and second outer casings are substantially mirror-symmetrical.

27. The system of claim 1 wherein the system includes a removable system connection cable, and wherein the first portion of the slip-ring assembly includes:
a cover having a plurality of grips for removably coupling the slip-ring assembly to the housing and an opening for passing the connection cable through the cover;
an electrical connector for electrically terminating the connection cable within the slip-ring assembly;
a plurality of spring-loaded contact pins electrically coupled to the electrical connector; and
a seal for water tight sealing of the contact pins;
and wherein the second portion of the slip-ring assembly includes a plurality of contact rings aligned with the plurality of spring-loaded contact pins.

28. The removable push-cable storage drum of claim 11 wherein the second portion of the slip ring is configured to be removably attachable to a corresponding cable storage drum housing.

29. The pipe inspection system of claim 21 wherein the first mating portion is configured to be removably attachable to the housing.

* * * * *